United States Patent
Patnaik

(10) Patent No.: US 11,794,640 B2
(45) Date of Patent: *Oct. 24, 2023

(54) MAINTAINING ROAD SAFETY WHEN THERE IS A DISABLED AUTONOMOUS VEHICLE

(71) Applicant: WAYMO LLC, Mountain View, CA (US)

(72) Inventor: Vijaysai Patnaik, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,853

(22) Filed: Aug. 9, 2022

(65) Prior Publication Data

US 2022/0383747 A1 Dec. 1, 2022

Related U.S. Application Data

(63) Continuation of application No. 16/991,282, filed on Aug. 12, 2020, now Pat. No. 11,447,067, which is a
(Continued)

(51) Int. Cl.
*B60Q 1/52* (2006.01)
*B60W 50/02* (2012.01)
(Continued)

(52) U.S. Cl.
CPC .............. *B60Q 1/52* (2013.01); *B60Q 9/008* (2013.01); *B60W 50/0205* (2013.01);
(Continued)

(58) Field of Classification Search
CPC ........ B60Q 1/52; B60Q 9/008; B60Q 1/5037; B60Q 1/507; B60Q 1/547;
(Continued)

(56) References Cited

U.S. PATENT DOCUMENTS 3,771,122 A 11/1973 Sattler
4,843,370 A 6/1989 Milde
(Continued)

FOREIGN PATENT DOCUMENTS

JP 2006341845 A 12/2006
KR 20140074104 A 6/2014
(Continued)

OTHER PUBLICATIONS

International Search Report and Written Opinion for Application No. PCT/US2020/043471 dated Nov. 17, 2020.
(Continued)

*Primary Examiner* — Daryl C Pope
(74) *Attorney, Agent, or Firm* — Botus Churchill IP Law LLP

(57) ABSTRACT

The technology relates to autonomous vehicles suffering a breakdown along a roadway. Onboard systems may utilize various proactive operations to alert specific vehicles or other objects on or near the roadway about the breakdown. This can be done alternatively or in addition to turning on the hazard lights or calling for remote assistance. The disabled vehicle is able to detect nearby and approaching objects. The detection may be performed in combination with a determination of the type of object or predicted behavior for that object, enables the vehicle to generate a targeted alert that can be transmitted or otherwise presented to that particular object. This approach provides the other object, such as a vehicle, bicyclist or pedestrian, sufficient time and information about the breakdown to take appropriate corrective action. Different communication options are available and may be selected based on the particular object, environmental conditions and other factors.

20 Claims, 22 Drawing Sheets

Related U.S. Application Data continuation of application No. 16/578,615, filed on Sep. 23, 2019, now Pat. No. 10,773,643.

(60) Provisional application No. 62/879,607, filed on Jul. 29, 2019.

(51) Int. Cl.
  *G07C 5/08* (2006.01)
  *B60Q 9/00* (2006.01)
  *G06V 20/56* (2022.01)
  *B60W 60/00* (2020.01)
  *G08G 1/16* (2006.01)

(52) U.S. Cl.
  CPC ......... *B60W 60/0015* (2020.02); *G06V 20/56* (2022.01); *G07C 5/0816* (2013.01); *G08G 1/162* (2013.01); *G08G 1/166* (2013.01); B60W 2050/021 (2013.01); B60W 2554/4026 (2020.02); B60W 2554/4029 (2020.02); B60W 2554/80 (2020.02); B60W 2554/802 (2020.02); B60W 2555/20 (2020.02); B60W 2710/20 (2013.01); B60W 2720/106 (2013.01)

(58) Field of Classification Search
  CPC ......... B60W 50/0205; B60W 60/0015; B60W 2050/021; B60W 2554/4026; B60W 2554/4029; B60W 2554/80; B60W 2554/802; B60W 2555/20; B60W 2710/20; B60W 2720/106; G06V 20/56; G06V 20/58; G07C 5/0816; G08G 1/162; G08G 1/166
  See application file for complete search history.

(56) References Cited

U.S. PATENT DOCUMENTS

| | | | |
|---|---|---|---|
| 6,583,734 B2 | 6/2003 | Bates et al. | |
| 6,972,669 B2 | 12/2005 | Saito et al. | |
| 8,026,800 B2 | 9/2011 | Person | |
| 9,764,640 B2 | 9/2017 | Matsuno et al. | |
| 9,953,538 B1 | 4/2018 | Matthiesen et al. | |
| 10,106,135 B2 | 10/2018 | Coelingh et al. | |
| 10,773,643 B1 | 9/2020 | Patnaik | |
| 11,447,067 B2 * | 9/2022 | Patnaik | G08G 1/166 |
| 2009/0248239 A1 | 10/2009 | Iwaki | |
| 2010/0194556 A1 | 8/2010 | Larosa | |
| 2010/0267379 A1 | 10/2010 | Staehlin et al. | |
| 2012/0038474 A1 | 2/2012 | De | |
| 2013/0044008 A1 | 2/2013 | Gafford et al. | |
| 2015/0239436 A1 | 8/2015 | Kanai et al. | |
| 2016/0133131 A1 | 5/2016 | Grimm et al. | |
| 2016/0278065 A1 | 9/2016 | Kim et al. | |
| 2018/0052463 A1 | 2/2018 | Mays | |
| 2018/0164823 A1 | 6/2018 | She et al. | |
| 2018/0173237 A1 | 6/2018 | Reiley et al. | |
| 2018/0308360 A1 | 10/2018 | Regmi | |
| 2019/0049948 A1 | 2/2019 | Patel et al. | |
| 2019/0155283 A1 | 5/2019 | Herbach et al. | |
| 2019/0156130 A1 | 5/2019 | Kozuka et al. | |
| 2019/0204845 A1 | 7/2019 | Grossman et al. | |
| 2020/0062199 A1 | 2/2020 | Kwon | |

FOREIGN PATENT DOCUMENTS

| | | |
|---|---|---|
| KR | 20180042638 A | 4/2018 |
| KR | 101927311 B1 | 12/2018 |
| WO | 2018111877 A1 | 6/2018 |

OTHER PUBLICATIONS

Theo Strauss, Breaking down the language barrier between autonomous cars and pedestrians, https://uxdesign.cc/wave-breaking-down-the-language-barrier-between-autonomous-cars-and-pedestrians-autonomy-tech-a8ba1f6686, Jul. 23, 2018, pp. 1-11.

Extended European Search Report for corresponding Application No. 20847994.9 dated Jul. 7, 2023 (17 pages).

* cited by examiner

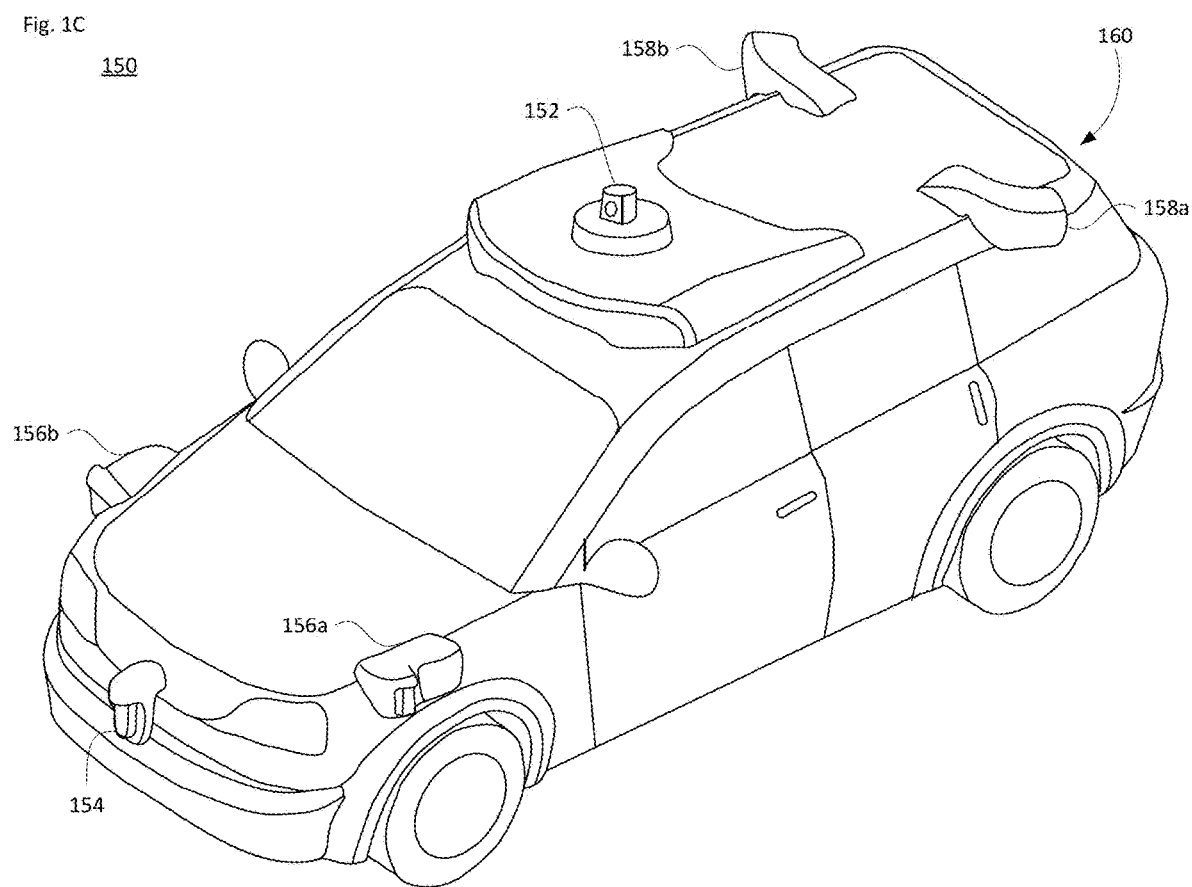

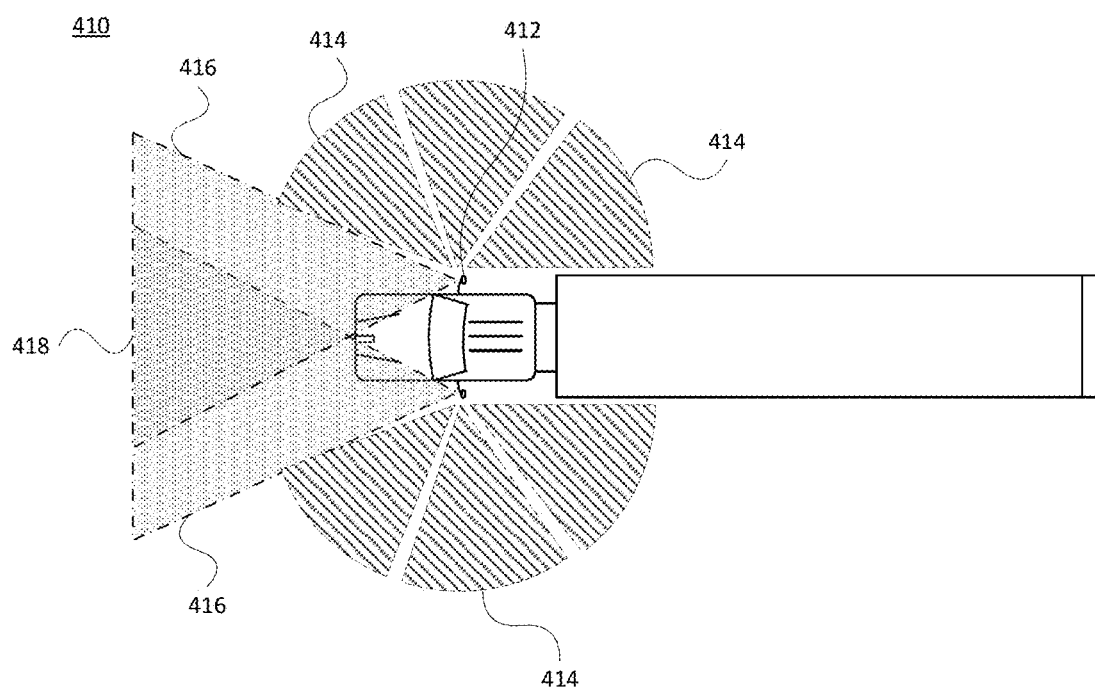

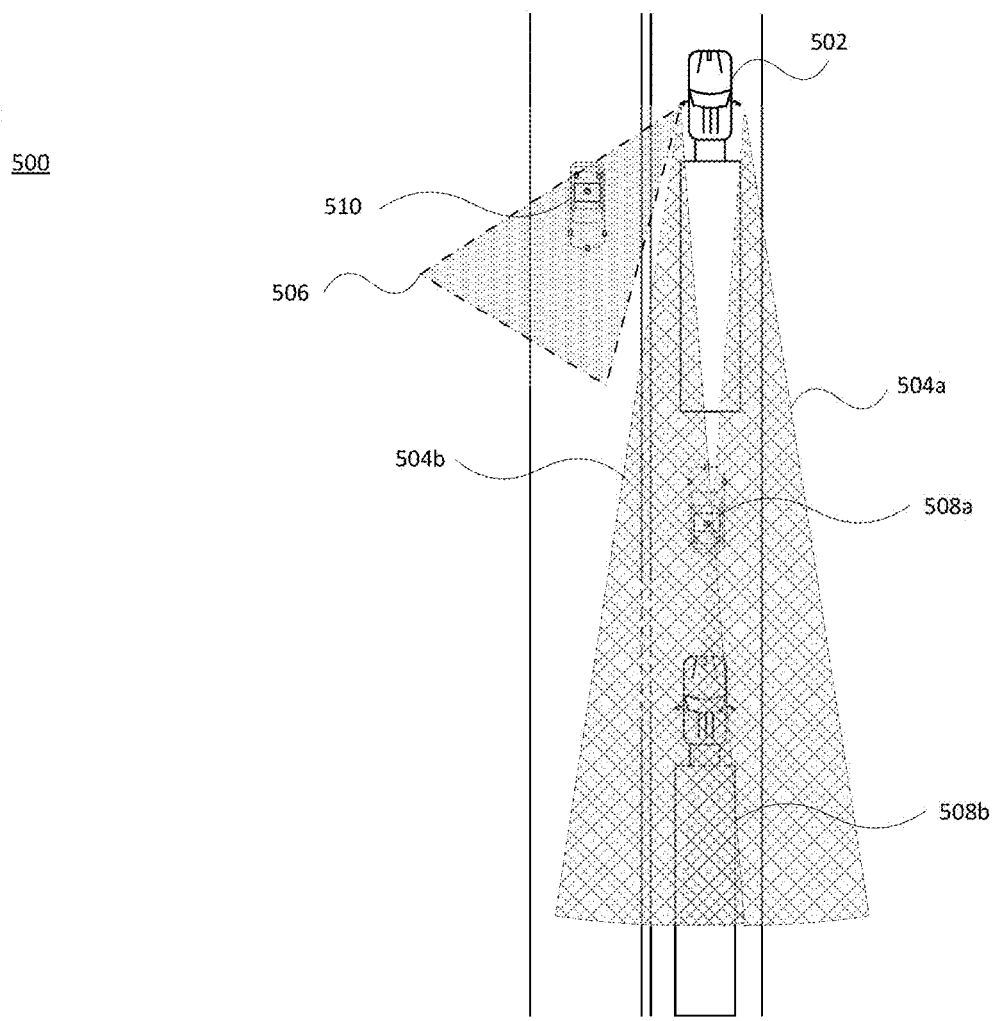

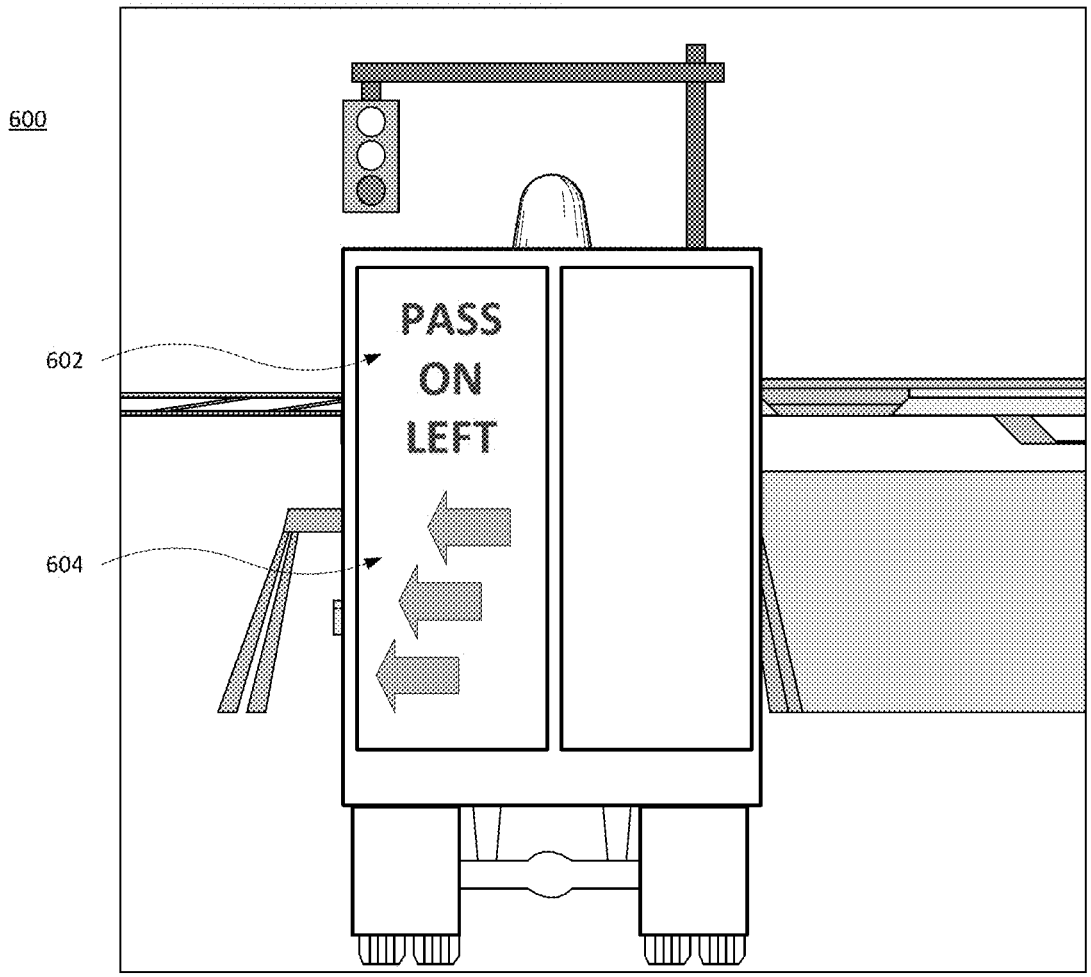

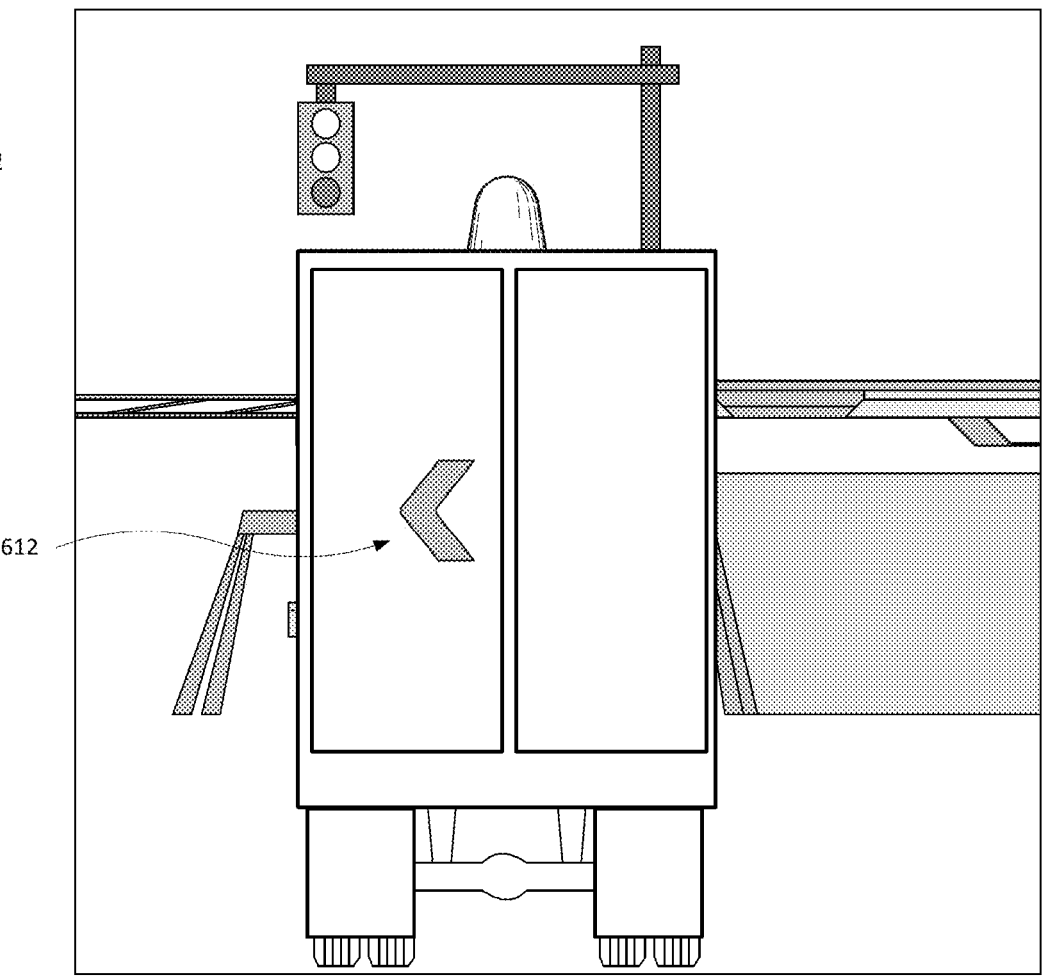

614

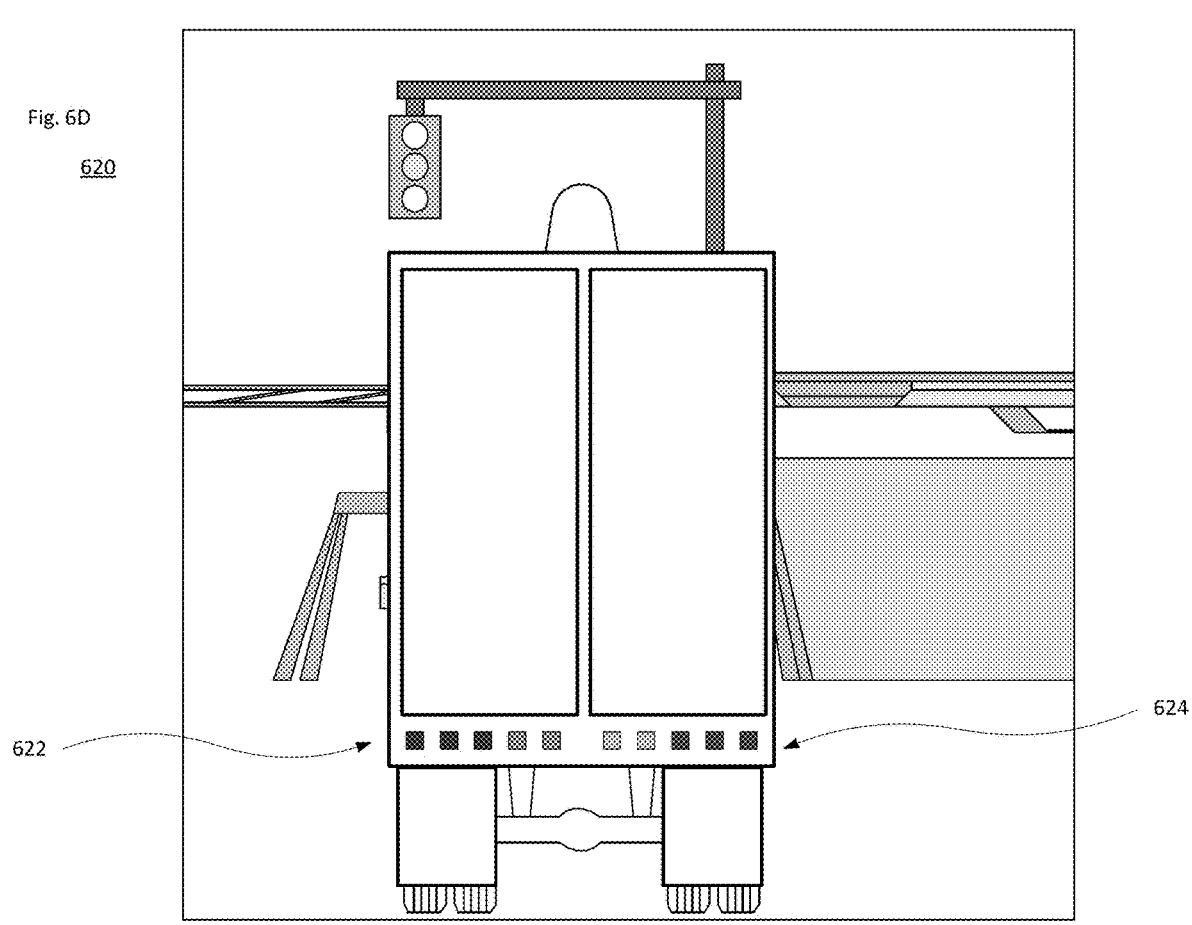

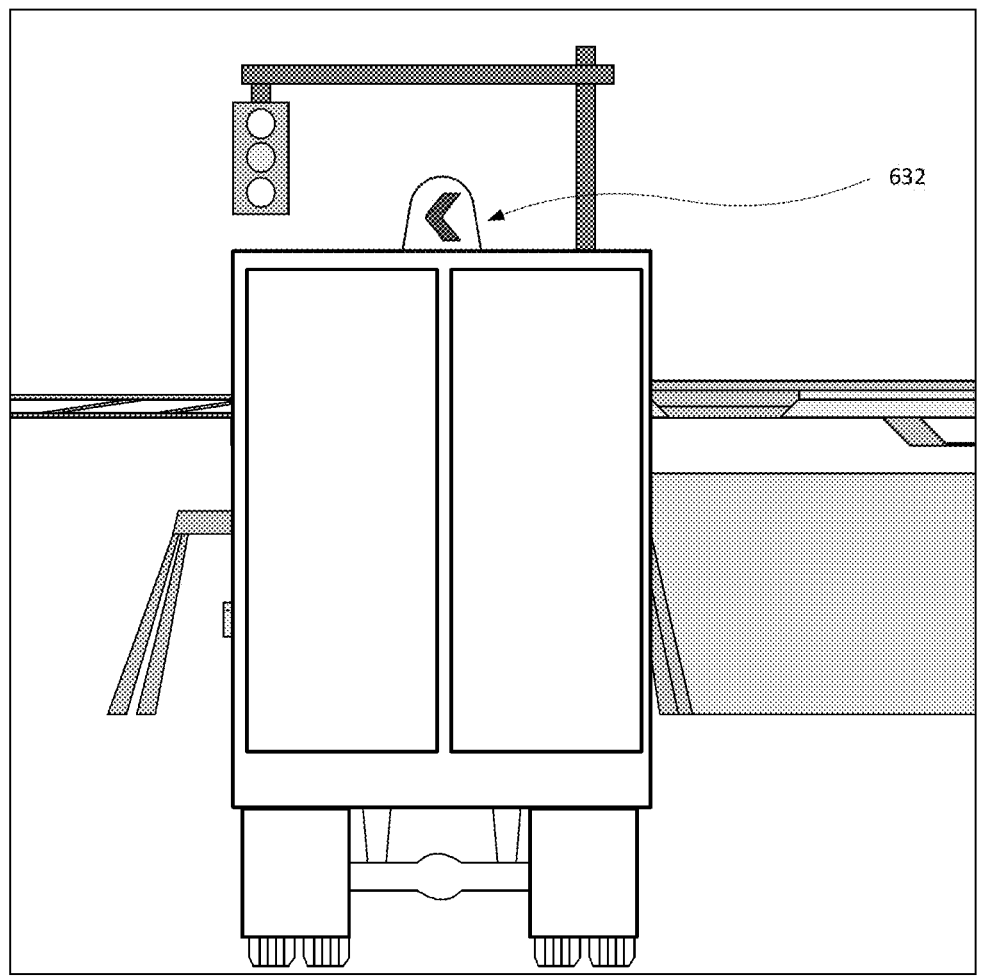

700

710

720

730

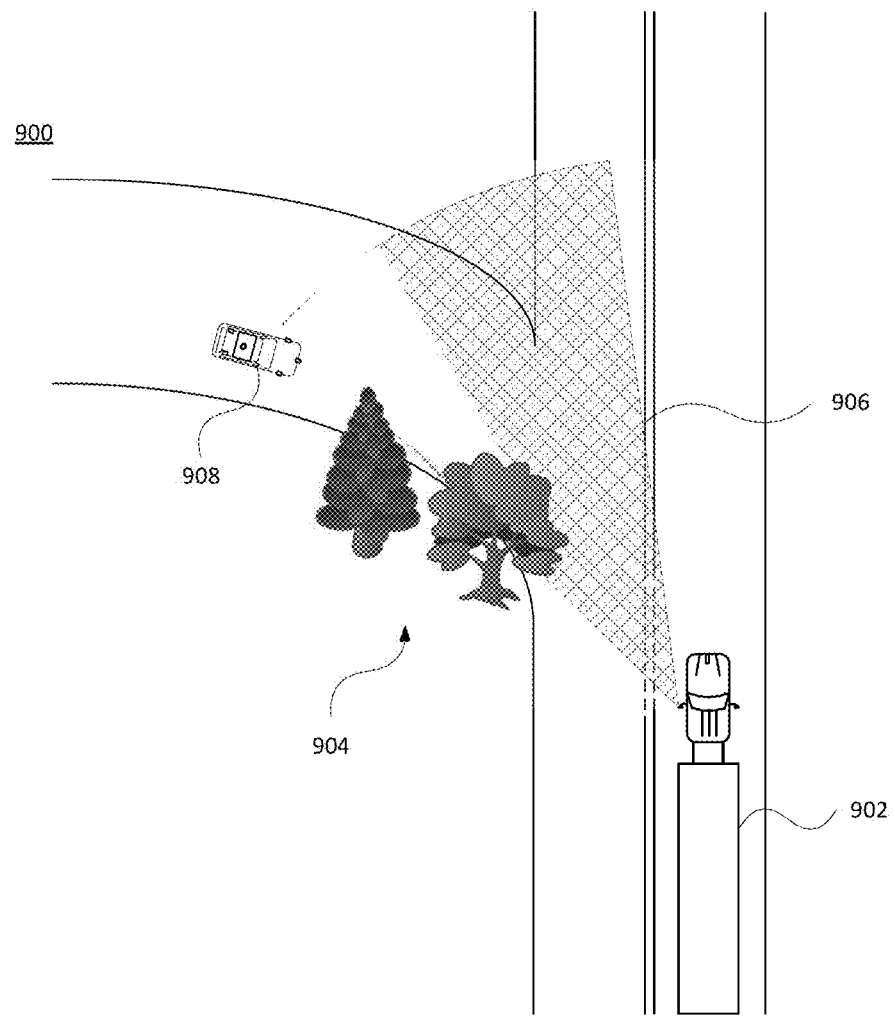

MAINTAINING ROAD SAFETY WHEN THERE IS A DISABLED AUTONOMOUS VEHICLE

CROSS-REFERENCE TO RELATED APPLICATIONS

The present application is a continuation of U.S. application Ser. No. 16/991,282, filed Aug. 12, 2020, which is a continuation of U.S. application Ser. No. 16/578,615, filed Sep. 23, 2019 and issued as U.S. Pat. No. 10,773,643 on Sep. 15, 2020, which claims the benefit of the filing date of U.S. Provisional Application No. 62/879,607, filed Jul. 29, 2019, the entire disclosures of which are hereby incorporated by reference.

BACKGROUND

Autonomous vehicles, such as vehicles that do not require a human driver, can be used to aid in the transport of trailered (e.g., towed) cargo, such as consumer goods, equipment, livestock or other items from one location to another. Such vehicles may operate in a fully autonomous mode or a partially autonomous mode where a person may provide some driving input. There may be situations where a cargo truck or other vehicle becomes partially or fully disabled and stops on the roadway. This could occur due to a mechanical or electrical fault, such as a flat tire or system failure. It may not be feasible or possible to pull off of the roadway. Other traffic on the roadway may also delay or prevent the vehicle from pulling over. These types of situations may create elevated safety risks for the autonomous vehicle as well as other vehicles and nearby objects.

BRIEF SUMMARY

The technology incorporates intelligent and enhanced options for an autonomous vehicle that becomes disabled along a roadway. This includes commencing various proactive operations to alert specific vehicles or other objects, which can be done alternatively or in addition to turning on the hazard lights or calling for remote assistance.

According to one aspect of the technology, a vehicle is configured to operate in an autonomous driving mode. The vehicle includes a driving system including a steering subsystem, an acceleration subsystem and a deceleration subsystem to control driving of the vehicle in the autonomous driving mode. It also includes a perception system having one or more sensors configured to detect objects in an environment external to the vehicle. A control system of the vehicle includes one or more processors. The control system is operatively coupled to the driving system and the perception system. The control system is configured to detect a breakdown condition of the vehicle. The breakdown condition is expected to prevent continued operation of the vehicle on a roadway. In response to detection of the breakdown condition, the control system is able to cause the driving system to stop the vehicle along a portion of the roadway. The control system is able to receive sensor information from the perception system, in which the sensor information identifies one or more detected objects in the environment external to the vehicle. The control system identifies at least one of an object type or a predicted behavior for a given one of the one or more detected objects, and based on at least one of the identified object type or the predicted behavior, selects a communication option from among a set of communication options to alert the given object about the breakdown condition. The vehicle is then able to present information about the breakdown condition to the given object according to the selected communication option.

In one example, selection of the communication option is further based on a distance between the given object and the vehicle. The communication option may be selected from the group consisting of static signage, persistent signage, dynamic signage, running lights, hazard lights, headlights, fog lights, and a sensor unit. Selection of the communication option may be based on whether the given object is determined to approach the vehicle from a same direction or a different direction than the vehicle was traveling prior to stopping.

In another example, the vehicle further comprises a display device mounted along an exterior surface of the vehicle. The information about the breakdown condition is able to be presented on the display device.

In yet another example, presentation of the information about the breakdown condition is varied based on a change in distance or a change in path of the given object relative to the vehicle.

Selection of the communication option may be further based on at least one of a time of day and a current environmental condition, Here, the current environmental condition may be selected from the group consisting of rain, snow, sleet, fog, dust and sun glare.

In a further example, presentation of the information about the breakdown condition to the given object according to the selected communication option includes providing both visual and aural information to the given object. Selection of the communication option may be further based on a detected or inferred occlusion in the environment external to the vehicle.

The control system may be further configured to select the portion of the roadway on which to stop.

In another example, the vehicle further comprises a warning information deployment system. Here, the control system is further configured to cause the warning information deployment system to deploy flares or signage in the environment external to the vehicle adjacent to the portion of the roadway where the vehicle is stopped.

In yet a further example, the vehicle also comprises a communication system configured to provide wireless connectivity with one or more remote devices. In this case, the control system is operatively coupled to the communication system, and the control system is further able to communicate with a remove assistance service via the communication system regarding the breakdown condition.

According to another aspect, a method for operating a vehicle in an autonomous driving mode is provided. The method includes detecting, by one or more processors of a control system of the vehicle, a breakdown condition of the vehicle. The breakdown condition is expected to prevent continued operation of the vehicle on a roadway. In response to detecting the breakdown condition, according to the method the one or more processors causing a driving system of the vehicle to stop the vehicle along a portion of the roadway. The method also includes receiving, by the one or more processors, sensor information from a perception system of the vehicle. The sensor information identifies one or more detected objects in the environment external to the vehicle. The method further includes identifying, by the one or more processors, at least one of an object type or a predicted behavior for a given one of the one or more detected objects. Based on at least one of the identified object type or the predicted behavior, the method selects, by the one or more processors, a communication option from among a set of communication options to alert the given object about the breakdown condition. The method further includes presenting information about the breakdown condition to the given object according to the selected communication option.

In one example, selection of the communication option is further based on one or more of a distance between the given object and the vehicle; at least one of a time of day and a current environmental condition; or a detected or inferred occlusion in the environment external to the vehicle.

Selecting the communication option may be further based on whether the given object is determined to approach the vehicle from a same direction or a different direction than the vehicle was traveling prior to stopping.

Presenting the information about the breakdown condition may either be varied based on a change in distance or a change in path of the given object relative to the vehicle. Alternatively or additionally, it may include providing both visual and aural information to the given object.

In yet another example, the method further comprises selecting the portion of the roadway on which to stop.

According to a further aspect, a non-transitory computer-readable storage medium is provided. The storage medium has instructions stored thereon. The instructions, when executed by one or more processors, cause the one or more processors to perform a method for operating a vehicle in an autonomous driving mode. The method includes detecting a breakdown condition of the vehicle, wherein the breakdown condition is expected to prevent continued operation of the vehicle on a roadway. In response to detecting the breakdown condition, the method causes a driving system of the vehicle to stop the vehicle along a portion of the roadway. Sensor information is received from a perception system of the vehicle. The sensor information identifies one or more detected objects in the environment external to the vehicle. The method also includes identifying at least one of an object type or a predicted behavior for a given one of the one or more detected objects. Based on at least one of the identified object type or the predicted behavior, the method includes selecting a communication option from among a set of communication options to alert the given object about the breakdown condition. The method also includes presenting information about the breakdown condition to the given object according to the selected communication option.

BRIEF DESCRIPTION OF THE DRAWINGS

FIG. 1C illustrates an example passenger vehicle arrangement for use with aspects of the technology.

FIGS. 4A-B illustrate example sensor fields of view for use with aspects of the technology.

FIGS. 5A-B illustrate an example driving scenario in accordance with aspects of the disclosure.

FIGS. 6A-E illustrate communication options for trailing vehicles in accordance with aspects of the disclosure.

FIG. 9 illustrates an occlusion scenario in accordance with aspects of the disclosure.

DETAILED DESCRIPTION

Aspects of the technology enable an autonomous vehicle that becomes disabled along a roadway (e.g., a cargo truck, bus, passenger vehicle, etc.) to detect nearby and approaching vehicles and other objects in or near the roadway. The detection, which may be performed in combination with a determination of the type of object, enables the vehicle to generate a targeted alert that can be transmitted or otherwise presented to that particular object. This gives the other object, such as a vehicle, bicyclist or pedestrian, sufficient time and information about the disabled situation to take appropriate corrective action.

Example Vehicle Systems

Figure 1A:
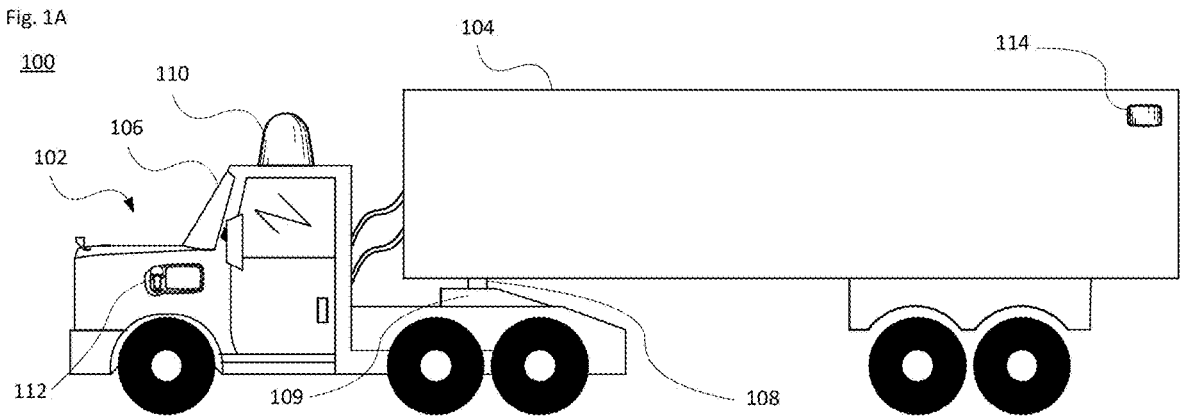
FIGS. 1A-B illustrates an example cargo vehicle arrangement for use with aspects of the technology.
Figure 1B:
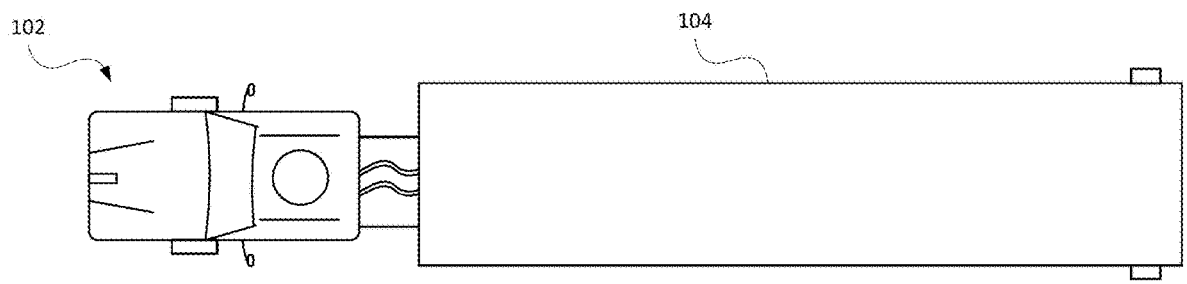

FIGS. 1A-B illustrate an example cargo vehicle 100, such as a tractor-trailer truck, and FIG. 1C illustrates an example passenger vehicle 150, such as a minivan. The cargo vehicle 100 may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the freight or other type of cargo (e.g., livestock) to be transported. The tractor unit 102 includes the engine and steering, systems (not shown) and a cab 106 for a driver and any passengers. In a frilly autonomous arrangement, the cab 106 may not be equipped with seats or manual driving components, since no person may be necessary.

The trailer 104 includes a hitching point, known as a kingpin 108. The kingpin 108 is configured to pivotally attach to the tractor unit. In particular, the kingpin attaches to a trailer coupling 109, known as a fifth-wheel, that is mounted rearward of the cab. Sensor units may be deployed along the tractor unit 102 and/or the trailer 104. The sensor units are used to detect information about the surroundings around the cargo vehicle 100. For instance, as shown the tractor unit 102 may include a roof-mounted sensor assembly 110 and one or more side sensor assemblies 112, which the trailer 104 may employ one or more sensor assemblies 114, for example mounted on the left and/or right sides thereof.

Similarly, the passenger vehicle 150 may include various sensors for obtaining information about the vehicle's external environment. For instance, a roof-top housing 152 may include a lidar sensor as well as various cameras and/or radar units. Housing 154, located at the front end of vehicle 150, and housings 156a, 156b on the driver's and passenger's sides of the vehicle may each incorporate a Lidar or other sensor. For example, housing 156a may be located in front of the driver's side door along a quarterpanel of the vehicle. As shown, the passenger vehicle 150 also includes housings 158a, 158b for radar units, lidar and/or cameras also located towards the rear roof portion of the vehicle. Additional lidar, radar units and/or cameras (not shown) may be located at other places along the vehicle 100. For instance, arrow 160 indicates that a sensor unit may be positioned along the read of the vehicle 150, such as on or adjacent to the bumper.

While certain aspects of the disclosure may be particularly useful in connection with specific types of vehicles, the vehicle may be any type of vehicle including, but not limited to, cars, trucks, motorcycles, buses, recreational vehicles, etc.

Figure 2A:
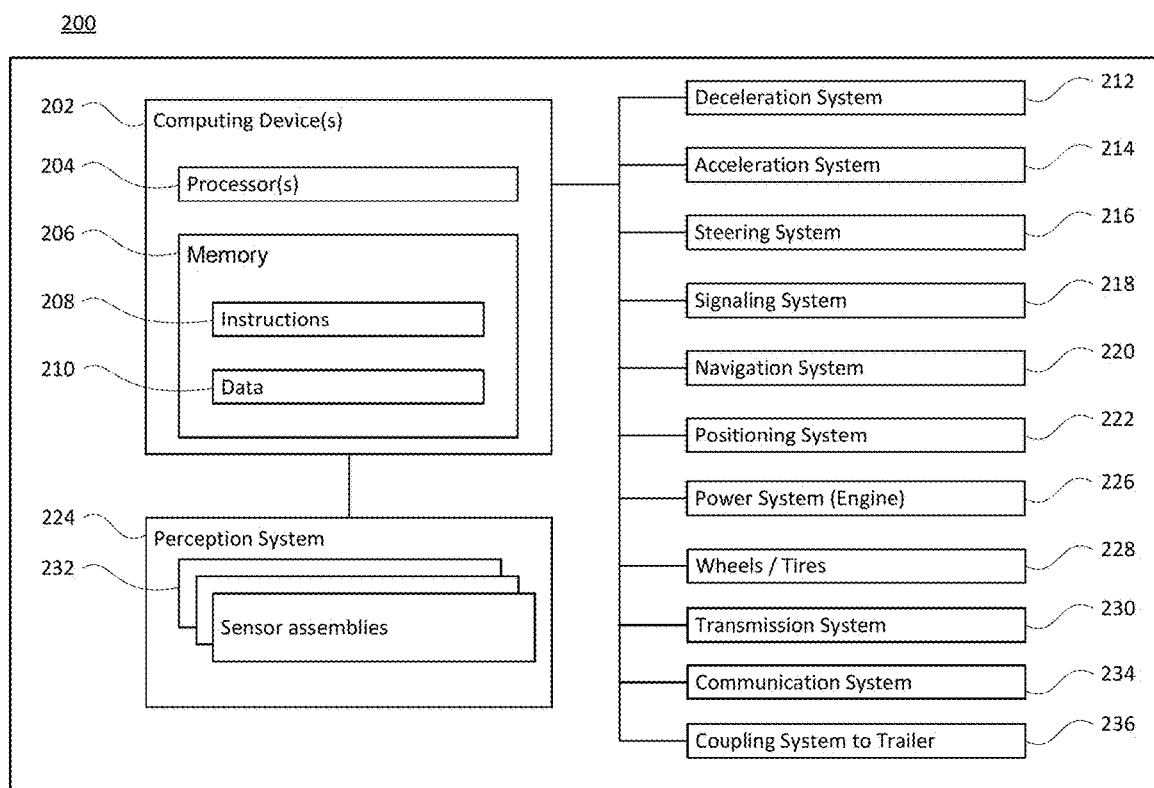
FIGS. 2A-B are functional diagrams of an example tractor-trailer vehicle in accordance with aspects of the disclosure.

FIG. 2A illustrates a block diagram 200 with various components and systems of a cargo vehicle, such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. By way of example only, the data 210 may include one or more behavior models for different vehicles (e.g., trucks, busses, passenger cars, motorcycles, construction or farm equipment, etc.) or other objects.

The behavior models may be used to generate, for selected observed objects external to the autonomous vehicle, one or more projected trajectories for the objects. Each projected trajectory may correspond to a possible path that the object may potentially traverse as well as the times that the object is expected to be at different points along that path. These projected trajectories may then be sent to and processed by various other system of the vehicles in order to make warning notification and other decisions for the vehicle.

In one example, some or all of the memory 206 may be an event data recorder or other secure data storage system configured to store vehicle diagnostics and/or detected sensor data. The one or more processor 204 may be any conventional processors, such as commercially available CPUs. Alternatively, the one or more processors may be a dedicated device such as an ASIC or other hardware-based processor. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, returning to FIG. 2A, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by illuminating turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of wheels of the tractor unit 102 to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information, including depot, warehouse or other facility maps. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes sensors for detecting objects external to the vehicle. The detected objects may be other vehicles, obstacles in the roadway, traffic signals, signs, trees, buildings or other structures, etc. For example, the perception system 224 may include one or more light detection and ranging (lidar) sensors, sonar devices, radar units, cameras (e.g., optical and/or infrared), inertial sensors (e.g., gyroscopes or accelerometers), and/or any other detection devices that record data which may be processed by computing devices 202. The sensors of the perception system 224 may detect objects and their characteristics such as location, orientation, size, shape, type (for instance, vehicle, pedestrian, bicyclist, etc.), heading, and speed of movement, etc. The raw data from the sensors and/or the aforementioned characteristics can be sent for further processing to the computing devices 202 periodically and continuously as it is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly, or between sensors in different sensor assemblies.

As indicated in FIG. 2A, the sensors of the perception system 224 may be incorporated into one or more sensor assemblies 232. In one example, the sensor assemblies 232 may be arranged as sensor towers integrated into the side-view mirrors on the truck, farm equipment, construction equipment or the like. Sensor assemblies 232 may also be positioned at different locations on the tractor unit 102 or on the trailer 104 (see FIGS. 1A-B), or along different portions of passenger vehicle 150 (see FIG. 1C). The computing devices 202 may communicate with the sensor assemblies located on both the tractor unit 102 and the trailer 104 or distributed along the passenger vehicle 150. Each assembly may have one or more types of sensors such as those described above.

Also shown in FIG. 2A is a communication system 234 and a coupling system 236 for connectivity between the tractor unit and the trailer. The coupling system 236 includes a fifth-wheel at the tractor unit and a kingpin at the trailer. The communication system 234 may include one or more wireless network connections to facilitate communication with other computing devices, such as passenger computing devices within the vehicle, and computing devices external to the vehicle, such as in another nearby vehicle on the roadway or at a remote network. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
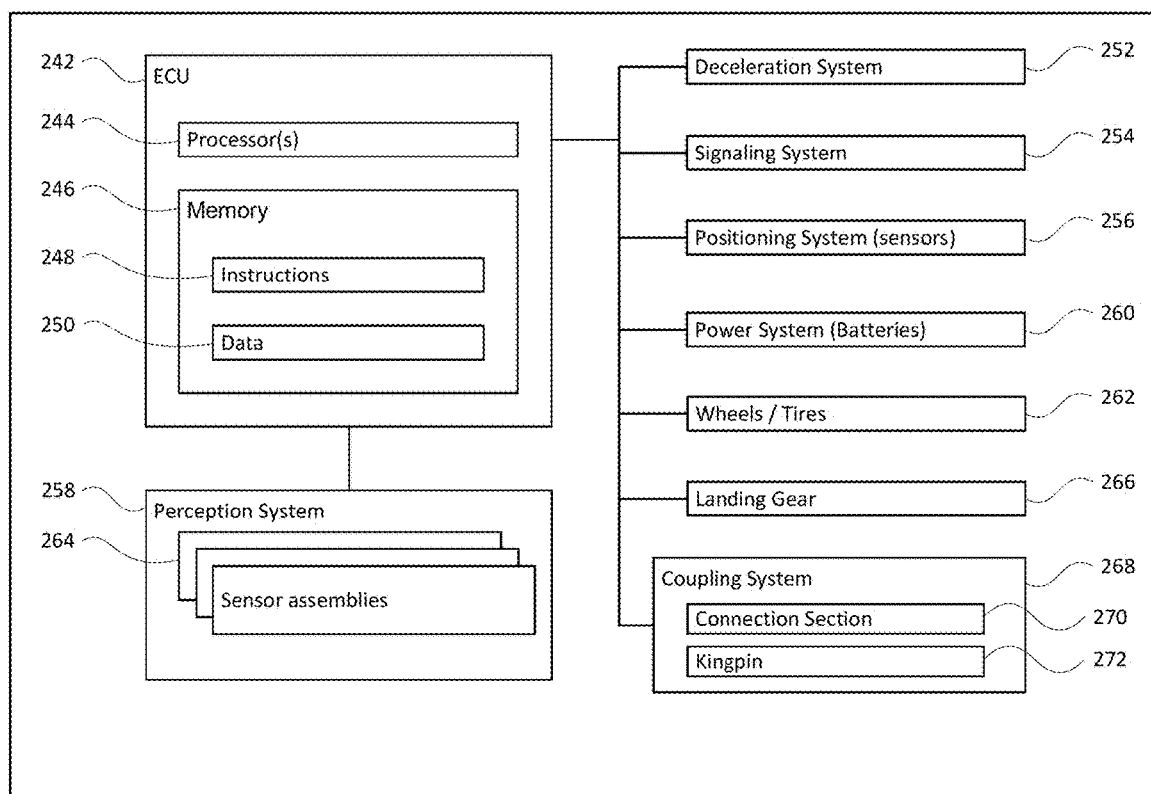

FIG. 2B illustrates a block diagram 240 of an example trailer. As shown, the system includes an ECU 242 of one or more computing devices, such as computing devices containing one or more processors 211, memory 246 and other components typically present in general purpose computing devices. The memory 246 stores information accessible by the one or more processors 244, including instructions 248 and data 250 that may be executed or otherwise used by the processor(s) 244. The descriptions of the processors, memory, instructions and data from FIG. 2A apply to these elements of FIG. 2B.

The ECU 242 is configured to receive information and control signals from the trailer unit. The on-board processors 244 of the ECU 242 may communicate with various systems of the trailer, including a deceleration system 252 (for controlling braking of the trailer), signaling system 254 (for controlling turn signals), and a positioning system 256 (for determining the position of the trailer). The ECU 242 may also be operatively coupled to a perception system 258 (for detecting objects in the trailer's environment) and a power system 260 (for example, a battery power supply) to provide power to local components. Some or all of the wheels/tires 262 of the trailer may be coupled to the deceleration system 252, and the processors 244 may be able to receive information about tire pressure, balance, wheel speed and other factors that may impact driving in an autonomous mode, and to relay that information to the processing system of the tractor unit. The deceleration system 252, signaling system 254, positioning system 256, perception system 258, power system 260 and wheels/tires 262 may operate in a manner such as described above with regard to FIG. 2A. For instance, the perception system 258, if employed as part of the trailer, may include at least one sensor assembly 264 having one or more lidar sensors, sonar devices, radar units, cameras, inertial sensors, and/or any other detection devices that record data which may be processed by the ECU 242 or by the processors 204 of the tractor unit.

The trailer also includes a set of landing gear 266, as well as a coupling system 268. The landing gear 266 provide a support structure for the trailer when decoupled from the tractor unit. The coupling system 268, which may be a part of coupling system 236 of the tractor unit, provides connectivity between the trailer and the tractor unit. The coupling system 268 may include a connection section 270 to provide backward compatibility with legacy trailer units that may or may not be capable of operating in an autonomous mode. The coupling system includes a kingpin 272 configured for enhanced connectivity with the fifth-wheel of an autonomous-capable tractor unit.

Figure 3:
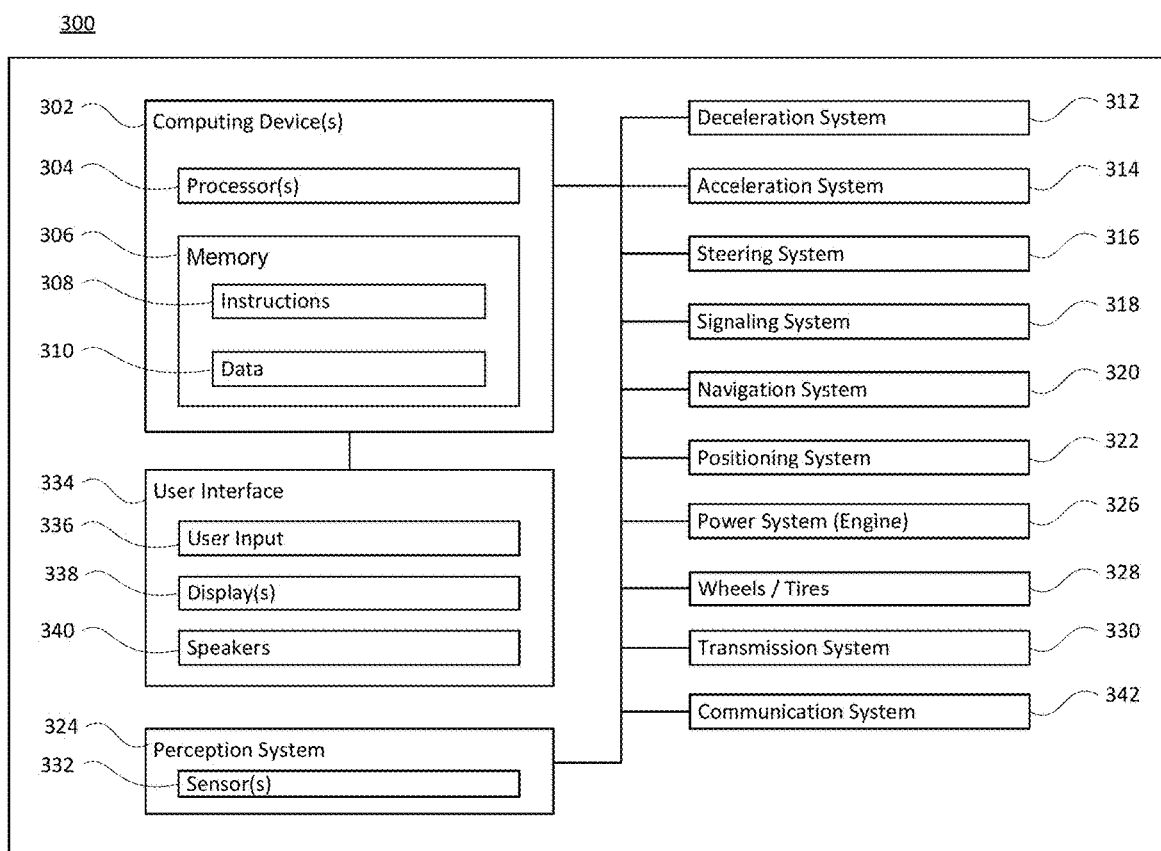
FIG. 3 is a function diagram of an example passenger vehicle in accordance with aspects of the disclosure.

FIG. 3 illustrates a block diagram 300 of various systems of a passenger vehicle. As shown, the system includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The descriptions of the processors, memory, instructions and data from FIG. 2A apply to these elements of FIG. 3.

As with the computing devices 202 of FIG. 2A, the computing devices 302 of FIG. 3 may control computing devices of an autonomous driving computing system or incorporated into a passenger vehicle. The autonomous driving computing system may be capable of communicating with various components of the vehicle in order to control the movement of the passenger vehicle according to primary vehicle control code of memory 306. For example, computing devices 302 may be in communication with various, such as deceleration system 312, acceleration system 314, steering system 316, signaling system 318, navigation system 320, positioning system 322, perception system 324, power system 326 (e.g., the vehicle's engine or motor), transmission system 330 in order to control the movement, speed, etc. of the in accordance with the instructions 208 of memory 306. The wheels/tires 328 may be controlled directly by the computing devices 302 or indirectly via these other systems. These components and subsystems may operate as described above with regard to FIG. 2A, For instance, the perception system 324 also includes one or more sensors 332 for detecting objects external to the vehicle. The sensors 332 may be incorporated into one or more sensor assemblies as discussed above.

Computing devices 202 may include all of the components normally used in connection with a computing device such as the processor and memory described above as well as a user interface subsystem 334. The user interface subsystem 334 may include one or more user inputs 336 (e.g., a mouse, keyboard, touch screen and/or microphone) and various electronic displays 338 (e.g., a monitor having a screen or any other electrical device that is operable to display information). In this regard, an internal electronic display may be located within a cabin of the passenger vehicle (not shown) and may be used by computing devices 302 to provide information to passengers within the vehicle. Output devices, such as speaker(s) 340 may also be located within the passenger vehicle.

A communication system 342 is also shown, which may be similar to the communication system 234 of FIG. 2A. For instance, the communication system 342 may also include one or more wireless network connections to facilitate communication with other computing devices, such as passenger computing devices within the vehicle, and computing devices external to the vehicle, such as in another nearby vehicle on the roadway, or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies. Ethernet. WiFi and HTTP, and various combinations of the foregoing.

Example Implementations

In view of the structures and configurations described above and illustrated in the figures, various implementations will now be described.

The onboard computing system, such as an ECU, may initially detect a fault, failure or other breakdown condition. For instance, the vehicle may identify a mechanical problem (e.g., brake issue, loss of power steering fluid, flat tire, overheating), electrical problem, communication problem, hardware problem (e.g., computer or sensor issue), software failure (e.g., an increase in latency), power supply problem, etc. Upon detection of the problem, the system may determine that the vehicle is unable to continue operating along a roadway. In some situations, the vehicle may be able to pull off the road on the shoulder or a breakdown lane. In other situations, the vehicle may not be able to pull off and may stop partially or fully in a lane of the road. In some instances, depending on the type and severity of the problem, the vehicle's control system may be able to select a place along the roadway to stop, such as along a straightaway instead of on a curve. By way of example, the control system may select a stopping location that minimizes occlusions for other road agents, e.g., to provide the best chance the other road agents will be able to see the vehicle from a distance. This may include planning to stop on a straightway instead of a curve, not stopping immediately after turns, not stopping in an area that might be occluded because of trees, etc.

Both before and after stopping, the vehicle may use the sensors of its perception system to detect vehicles and other objects on or near the roadway. One way that the vehicle may determine how to communicate its stalled or otherwise disabled status to other roadway users is to use the information obtained by the perception system to determine object types and predict object behaviors. Information about the roadway itself, such as any incline/decline, curvature, number of lanes, etc., may be obtained from roadgraph data from detailed maps stored in memory. Information about current weather conditions may be obtained from onboard sensors and data received from a remote service.

In order to detect objects in the environment and conditions around the vehicle, different types of sensors and layouts may be employed as part of the vehicle's perception system. Examples of these were discussed above with regard to FIGS. 1-2. The field of view (FOV) for each sensor can depend on the sensor placement on a particular vehicle. In one scenario, the information from one or more different kinds of sensors may be employed so that the tractor-trailer or other vehicle may operate in an autonomous mode. Each sensor may have a different range, resolution and/or FOV.

For instance, the sensors may include a long range FOV lidar and a short range FOV lidar. In one example, the long range lidar may have a range exceeding 50-250 meters, while the short range lidar has a range no greater than 1-50 meters. Alternatively, the short range lidar may generally cover up to 10-15 meters from the vehicle while the long range lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range lidars, or by a medium range Lidar that may also be included in the sensor system. In addition to or in place of these Lidars, a set of cameras (e.g., optical and/or infrared) may be arranged, for instance to provide forward, side and rear-facing imagery. Similarly, a set of radar sensors may also be arranged to provide forward, side and rear-facing data.

Figure 4A:
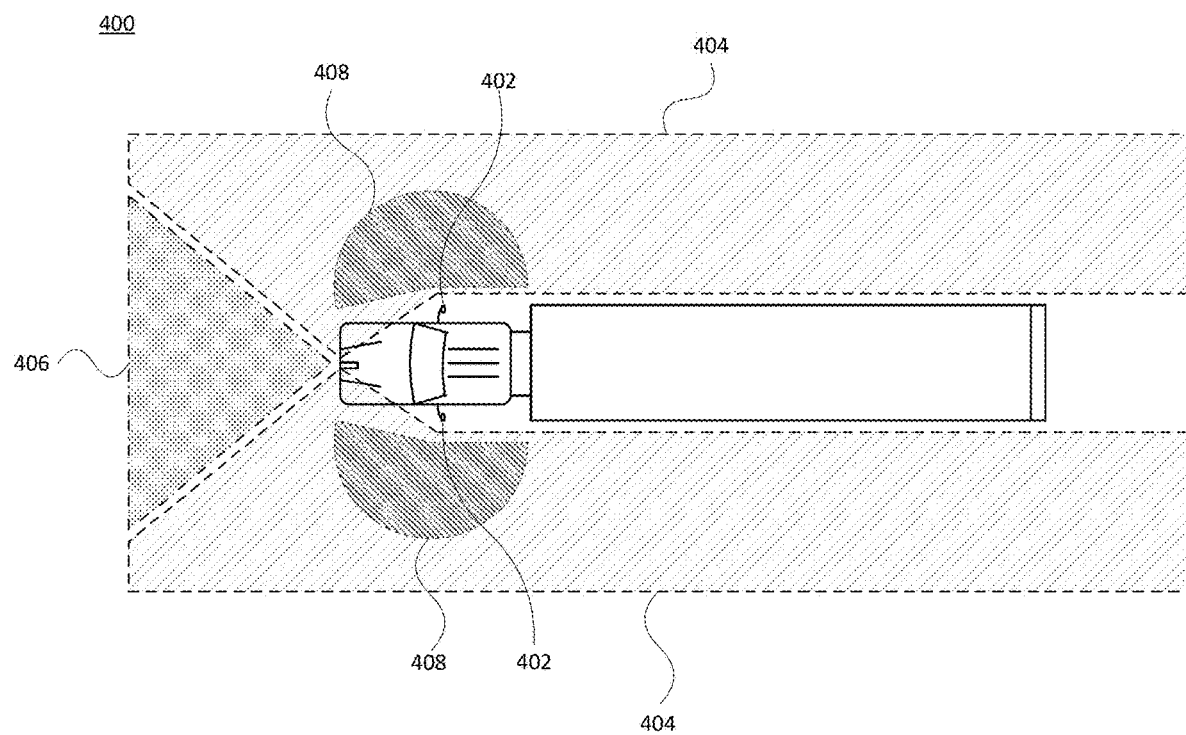

FIGS. 4A-B illustrate example sensor configurations and fields of view on a cargo vehicle. In particular, FIG. 4A presents one configuration 400 of lidar, camera and radar sensors. In this figure, one or more lidar units may be located in sensor housing 402. In particular, sensor housings 402 may be located on either side of the tractor unit cab, for instance integrated into a side view mirror assembly or extending from the roof of the cab. In one scenario, long range lidars may be located along a top or upper area of the sensor housings 402. For instance, this portion of the housing 402 may be located closest to the top of the truck cab or roof of the vehicle. This placement allows the long range lidar to see over the hood of the vehicle. And short range lidars may be located along a bottom area of the sensor housings 402, closer to the ground, and opposite the long range lidars in the housings. This allows the short range lidars to cover areas immediately adjacent to the cab. This would allow the perception system to determine whether an object such as another vehicle, pedestrian, bicyclist, etc., is next to the front of the vehicle and take that information into account when determining how to drive or turn in view of an aberrant condition.

As illustrated in FIG. 4A, the long range lidars on the left and right sides of the tractor unit have fields of view 404. These encompass significant areas along the sides and front of the vehicle. As shown, there is an overlap region 406 of their fields of view in front of the vehicle. A space is shown between regions 404 and 406 for clarity; however in actuality there would desirably be overlapping coverage. The short range lidars on the left and right sides have smaller fields of view 408. The overlap region 406 provides the perception system with additional or information about a very important region that is directly in front of the tractor unit. This redundancy also has a safety aspect. Should one of the long range lidar sensors suffer degradation in performance, the redundancy would still allow for operation in an autonomous mode.

FIG. 4B illustrates coverage 410 for either (or both) of radar and camera sensors on both sides of a tractor-trailer. Here, there may be multiple radar and/or camera sensors in each of the sensor housings 412. As shown, there may be sensors with side and rear fields of view 414 and sensors with forward facing fields of view 416. The sensors may be arranged so that the side and rear fields of view 414 overlap, and the side fields of view may overlap with the forward facing fields of view 416. As with the long range lidars discussed above, the forward facing fields of view 416 also have an overlap region 418. This overlap region provides similar redundancy to the overlap region 406, and has the same benefits should one sensor suffer degradation in performance.

While not illustrated in FIGS. 4A-4B, other sensors may be positioned in different locations to obtain information regarding other areas around the vehicle, such as along the rear or underneath the vehicle. The perception system may take raw or processed sensor data from the sensors to identify characteristics such as location, orientation, size, shape, type (for instance, vehicle, pedestrian, bicyclist, etc.), heading, and speed of movement, etc. The information generated by the perception system can sent for further processing to other parts of the onboard computer system (e.g., a planning system) or to a remote system, for instance to predict short- or long-term behavior of the detected objects.

This can be done in accordance with one or more behavior models for different categories or types of objects. By way of example, the system may access a behavior model that provides the probability of one or more actions being, taken by a detected object. The system may predict a detected vehicle's future movement by analyzing data relating to the other vehicle's current surroundings and determining bow the other vehicle will likely respond to those surroundings. In other words, the system may use an object-centric view of the object's environment, in that the system determines what the other vehicles are perceiving in order to better predict how those vehicles will behave. For instance, a bicyclist may be projected to ride close to the shoulder of the roadway or along a portion of the roadway marked for use by bicyclists.

Once current and/or predicted information about another object (e.g., roadway user) is obtained, the vehicle may utilize different strategies to alert that particular object. As discussed further below, this can include honking the horn (for instance changing the sound or pitch), flashing or moving the headlights in a particular manner, turning on interior cabin lights, or otherwise taking action to warn an (approaching) object such as another vehicle, bicyclist or pedestrian. Electronic displays of different patterns, colors and textual information can be presented along a portion of the vehicle, such as the back and/or side panels of a trailer. A sensor assembly mounted on the vehicle itself can provide an alert, or the sensor assembly may be used to project information onto the roadway or elsewhere that is likely to be observed by the other object, e.g., a wall of an adjacent building.

In accordance with one aspect of the technology, the system implements a "playbook" or set of warning signals available to the vehicle. The playbook may include different signals or ways of presenting information that, for instance, varies from conservative to aggressive. The approach(es) selected can depend on the severity of the situation, the proximity of the other object, and the likelihood that the other object will detect the information provided by the vehicle. Similarly, there may be a list of scenarios fed to the vehicle, e.g., from a remote assistance service, and a mapping of which scenarios warrant what level of conservative/ aggressive warning signals. These scenarios would cover different time of day, detected traffic conditions, real-time detection of weather, etc.

Example Scenarios

As noted above, there are various situations in which a vehicle may be operating in a self-driving mode and experience a fault, failure or other condition that will cause or require the vehicle to stop partly or fully along the roadway. This can be due to a mechanical failure (e.g., blown tire, brake failure, loss of power steering fluid, overheating, etc.), electrical fault (e.g., loss of communication with a subsystem or a short in a sensor or other component) or other problem (e.g., loss of power due to low battery or low fuel level). Other conditions may be due to roadway or environmental conditions, such as a flooded area, rockslide or mudslide that covers at least part of the roadway. These other conditions may involve the vehicle becoming stranded rather than being disabled. Yet another condition can involve construction, temporary closures or other detours in which all vehicles must exit a roadway. Here, a vehicle such as a truck may be unable to use the detour route (e.g., surface streets through a residential neighborhood) or may not be capable of operating in an autonomous mode along the detour.

In addition to requesting service or other assistance, it is important from a safety standpoint to communicate the vehicle's situation to other roadway users. Turning on the vehicle's flashers or honking the horn repeatedly might draw attention to the situation if other users happen to be looking in the right spot or are able to hear the horn. However, a more nuanced approach that identifies the presence of other roadway users, such as other trucks, buses, cars, bicyclists and even pedestrians, and tailors the warning information to those users, is more likely to provide the necessary information and give as much advanced warning as possible to them.

Figure 5B:
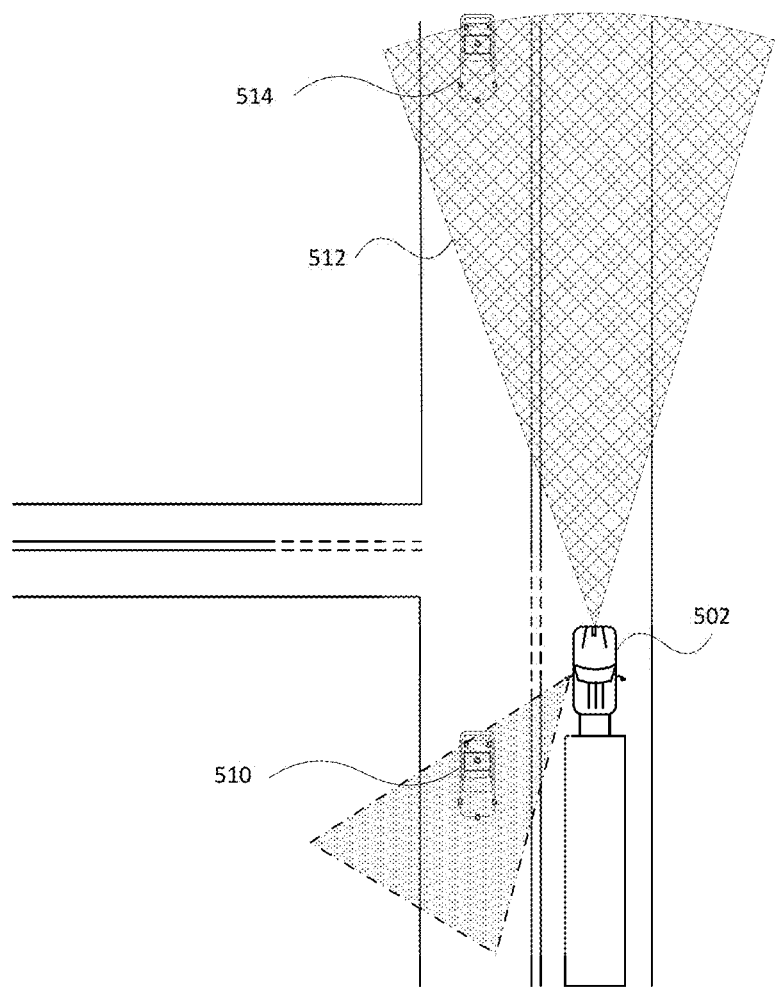

FIGS. 5A-B illustrate one example 500 in which vehicle 502 is operating in an autonomous driving mode. As shown in FIG. 5A, the vehicle 502 has one or more sensors that provide fields of view 504a and 504b toward the rear, and one or more sensors that provide a field of view 506 to one side of the vehicle. And as shown in FIG. 5B, one or more forward facing sensors may provide a front field of view 512. Other sensors may provide other fields of view (not shown) toward other areas around the vehicle. In this case, the fields of view 504a,b detect vehicles 508a and 508b behind the vehicle and traveling in the same direction, while field of view 506 detects vehicle 510. And as shown in FIG. 5B field of view 512 detects vehicle 514 traveling in the opposite direction.

As noted above, the perception system of the vehicle 502 may detect current information about these other objects from the sensor data, such as position/location, orientation, speed, and may determine an object type (e.g., vehicle, bicyclist, pedestrian, etc.). The on-board computer system or an off-board system (e.g., a remote assistance service) may use this information in conjunction with one or more behavior models associated with specific object types to estimate current actions and/or to predict future actions of such objects. In addition, the on-board and/or off-board system(s) may select one or more warning signals or methods of communicating such signals to the other objects based on the estimated or predicted actions of the other objects. For instance, it may be determined that the vehicle 508a is a fully autonomous passenger vehicle such as a sedan, having one or more lidar sensors or optical cameras. It may be determined that the vehicle 508b is a tractor-trailer truck operating in a partially autonomous mode with a human drive performing some of the driving operations of the vehicle. Here, the tractor-trailer may also have one or more sensors supporting the partially autonomous driving mode. It may be determined that the vehicle 510 is another passenger vehicle that is being operated by a human driver in a manual driving mode, while the vehicle 514 is too far away to determine whether is it being driven in a manual or autonomous driving mode.

Figure 6C:
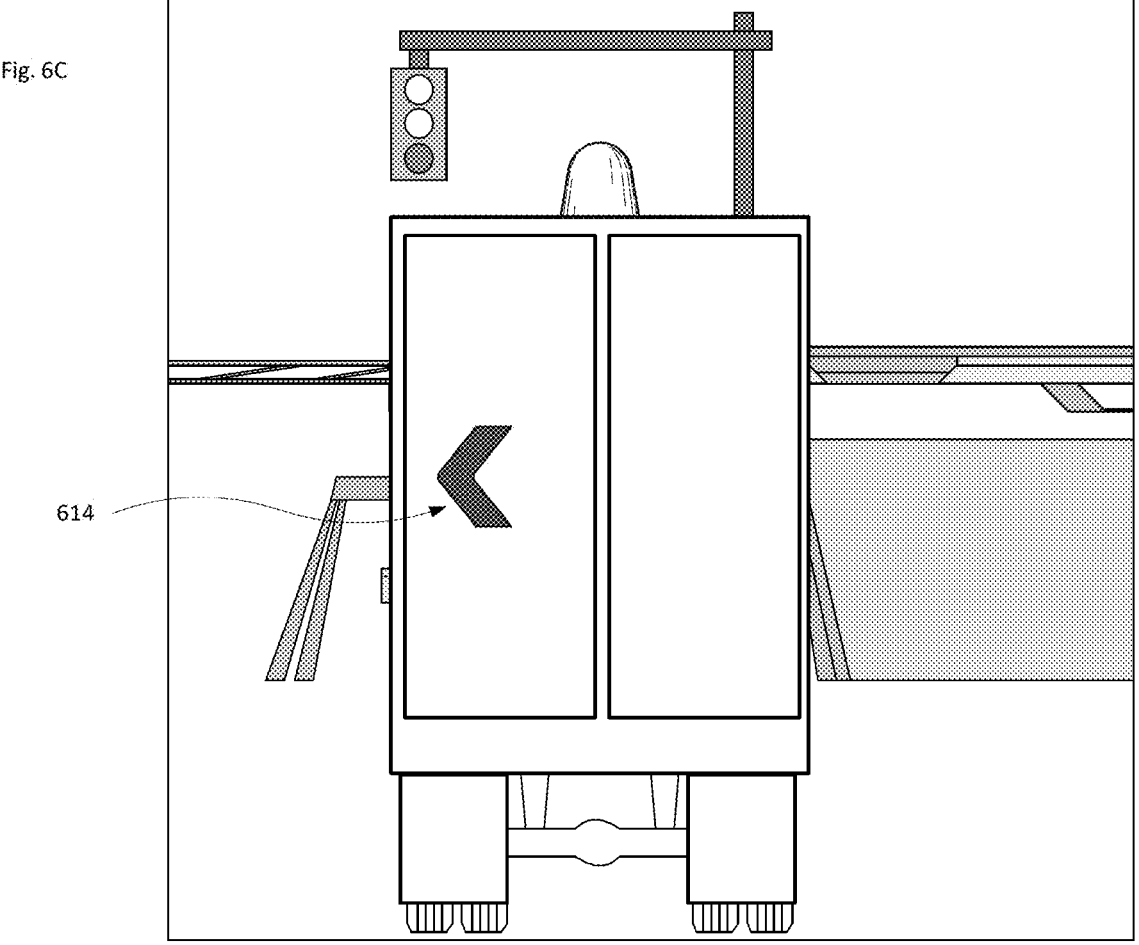

For the trailing vehicles 508a and 508b, the vehicle may provide information using one or more different communication options, as shown in FIGS. 6A-6D. For instance, example 600 of FIG. 6A illustrates static or persistent signage displayed on a rear door or other portion of the vehicle, which may be visible for detection by either a human driver or by an optical sensor of a vehicle operating in an autonomous driving mode. This may include text 602 and/or icons or other graphical objects 604. Example 610 of FIGS. 6B-C illustrates dynamic signage displayed on a rear door or other portion of the vehicle, which may be visible for detection by either a human driver or by an optical sensor of a vehicle operating in an autonomous driving mode. Here, transitioning graphics (e.g., text and/or icons) 612 (FIG. 6B) and 614 (FIG. 6C) may point to a side for approaching vehicles to pass, or provide other information. The text, icons or other graphics may be different colors (or greyscale), and can change appearance as needed depending on the playbook approach, such as changing from flashing green to flashing yellow to flashing red.

In example 620 of FIG. 6D, running lights or other external indicators 622 and 624 (e.g., brake lights) may flash, pulse, brighten/dun and/or otherwise change appearance to indicate the vehicle condition, which side to pass on, etc. And in example 630 of FIG. 6E, LEDs on the sensor housing or the sensor housing 632 itself may present warning information to an approaching vehicle. Here the sensor housing 632 is shown located on a roof of the vehicle, e.g., the roof of the cab or the trailer of a cargo truck. Other sensor housing locations around the vehicle may also be employed, such as the sides, front bumper or rear bumper.

Figure 7A:
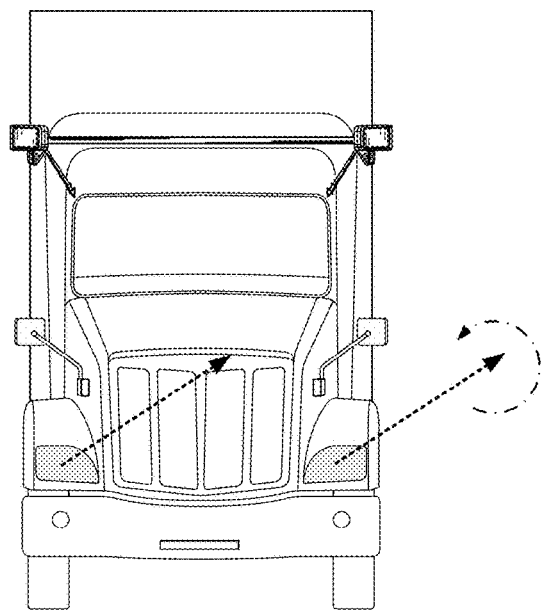
FIGS. 7A-D illustrate additional communication for oncoming vehicles in accordance with aspects of the disclosure.
Figure 7B:
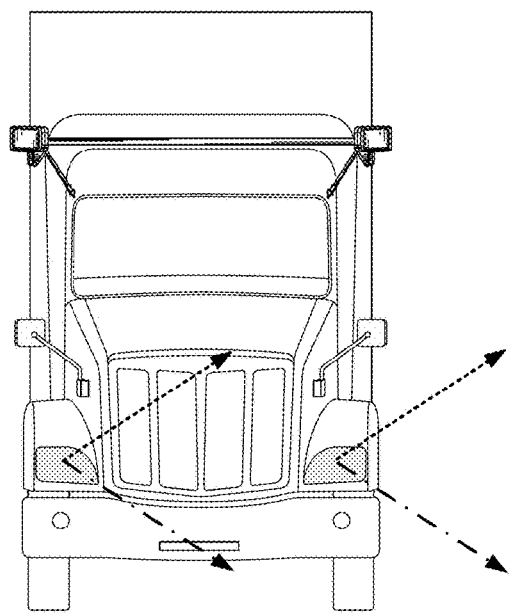
Figure 7C:
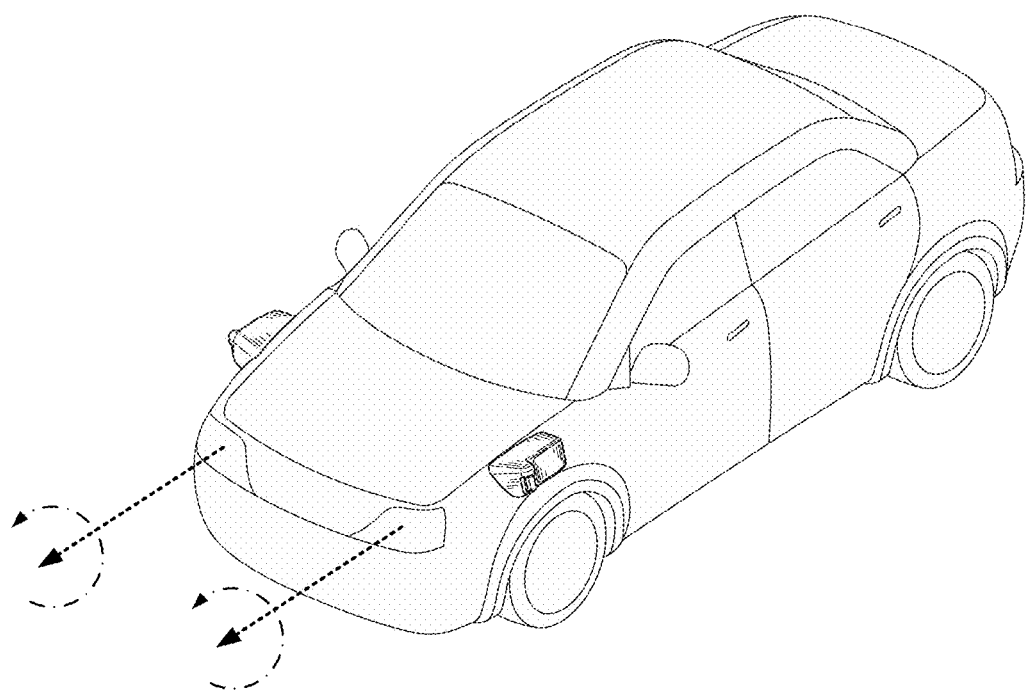

For the vehicles 510 and 514 approaching from the opposite or a different direction, the system may use any of the approaches from FIGS. 6A-E, as well as the headlights. By way of example, FIG. 7A illustrates one approach 700 in which the beams of the headlights may be swept left/right, up/down, and/or clockwise/counterclockwise, as shown by the circular dash-dot arrow. FIG. 7B illustrates another approach 710 in which the dashed lines and dotted lines indicate that the beams from the headlight may be alternatively angled upward and downward. As shown in these figures, the vehicle may be a truck or other large vehicle. However, as shown in example 720 of FIG. 7C these techniques may also be employed with a passenger vehicle as well as other types of autonomous vehicles.

Figure 7D:
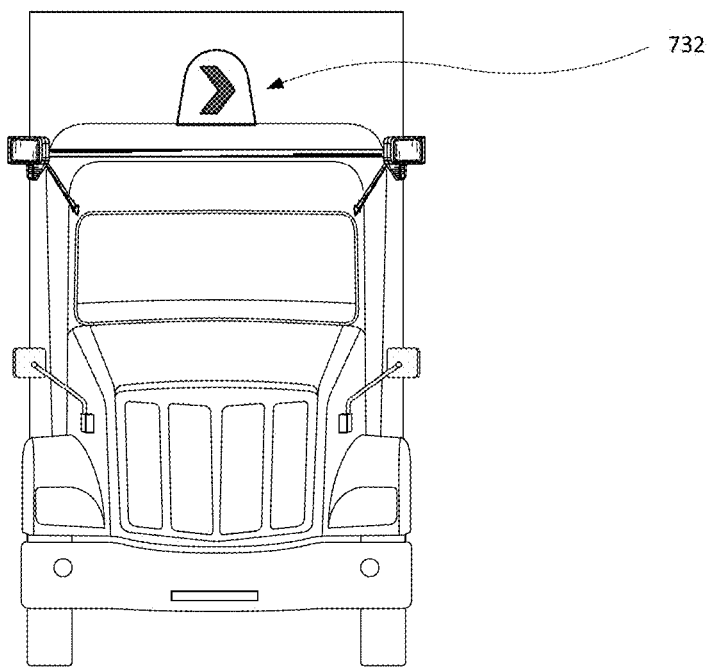

FIG. 7D illustrates another example 730 where LEDs on the sensor housing or the sensor housing 732 itself may present warning information to an approaching vehicle. Here the sensor housing 732 is shown located on a roof of the cab, although other sensor housing locations around the vehicle may also be employed, such as the sides or front bumper.

Figure 8:
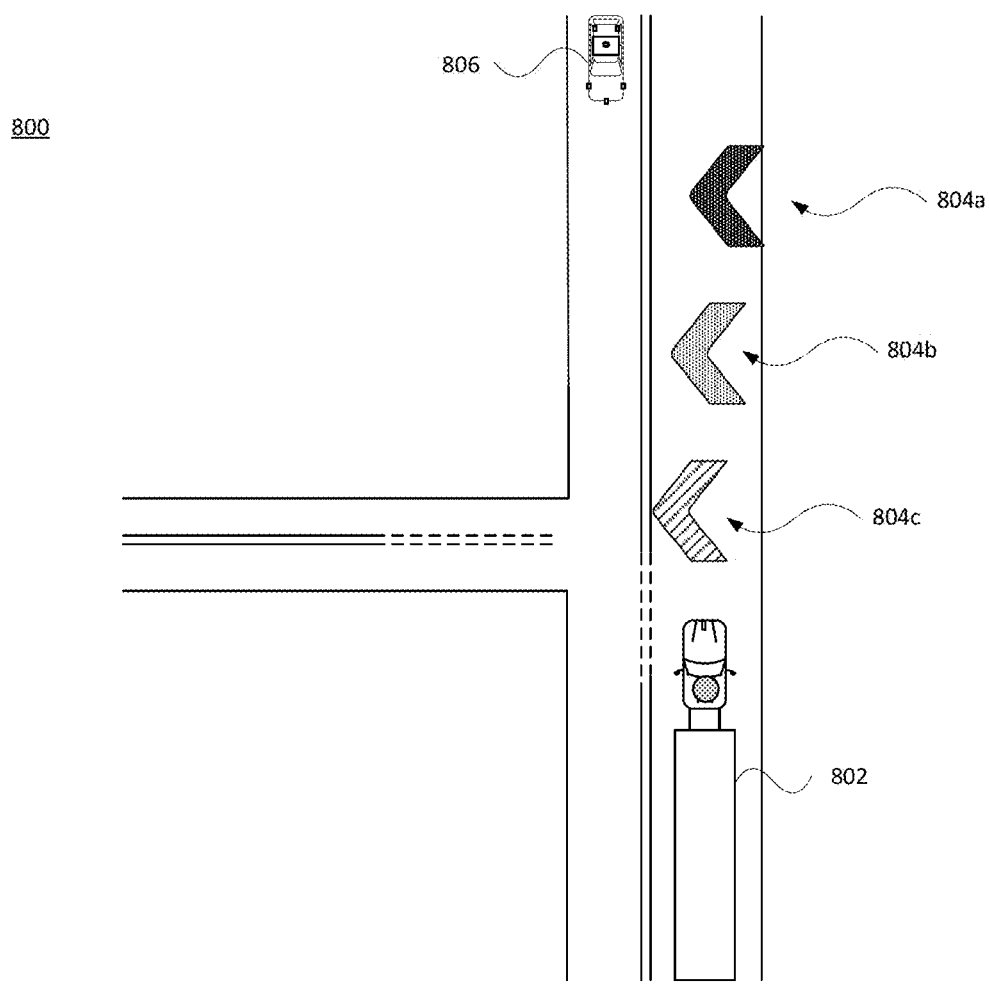
FIG. 8 illustrates a road communication scenario in accordance with aspects of the disclosure.

FIG. 8 illustrates yet another example 800 in which the vehicle 802 projects graphics or other imagery 804 onto the roadway. For instance, a series of direction arrows 804a, 804b and 804c may be projected at one or more locations on the roadway for viewing by approaching vehicle 806. The imagery 804 may be presented optically for viewing by a human driver or an optical sensor of the vehicle 806. Alternatively, the imagery 804 may be presented using other bands of the electromagnetic spectrum, such as infrared, for detection by other sensors of the vehicle 806. The determination of what type of imagery 804 and what spectrum band(s) to use may involve the vehicle 802 determining what type of object the vehicle 806 is, and its sensing capabilities.

According to another aspect, the disabled autonomous vehicle may implement different warning responses depending on the distance of an approaching or nearby vehicle. For instance, in one example the interior cabin lights may be turned on and electronic displays on the side of the vehicle may be illuminated (e.g., lit in red) as soon as vehicle is stalled, irrespective of whether there is an approaching vehicle or not. This may be considered a default warning indication that does not account for the presence of other objects in the environment.

Depending on the road type and roadgraph information from a stored or received map database, the vehicle may take different actions or no additional action. For instance, if it is a divided freeway, then a vehicle approaching from the front is not a concern as it is location on the other side of a barrier. Thus, in this case no further action need be taken by the vehicle (besides any default warning indication).

In contrast, when another vehicle approaches from the front and the roadgraph indicates that it is not a divided highway, then the system may deploy a conservative tactic to warn the approaching vehicle. Here, the tactic may account for the distance at which the other vehicle is detected. For instance, if an oncoming vehicle is detected at around 500 m or 15 seconds away, the system may flash the vehicle's headlights three or more times within a predetermined timeframe (e.g., 0.5-5.0 seconds, or more or less). As the oncoming vehicle approaches and the intervening distance shrinks (e.g., to 300 m or 10 seconds away), the vehicle's perception system can detect whether the other vehicle has moved to a different lane farther from the lane of the disabled vehicle. If this is not the case, and/or the other vehicle continues to proceed at approximately the same rate of speed (e.g., has not meaningfully slowed down), then the vehicle may employ more aggressive tactics to warn the approaching vehicle. This can include continuously flashing the headlights, flash them in a pattern, rotate them, etc. Audible cues such as honking once every two seconds may alternatively or additionally be employed.

For a vehicle approaching from the rear, the response may also vary based on distance of the approaching vehicle. In this case, at a further away distance, e.g., in excess of 500 m (or more than 15-20 seconds), blinking hazard lights and/or electronic display along the rear of the vehicle can serve as an initial warning. For instance, an electronic display at the back of a cargo truck could alternate graphics or other imagery between something that sensors or drivers of faraway vehicles can detect, such as a large solid red warning sign.

At closer distances, if the vehicle approaching from behind is still in the disabled vehicle's lane, the system can apply more aggressive tactics. This can include one or more of the following: apply all brake lights, instead of just the hazard lights; honk every 2 seconds or more or less frequently; and change the rear electronic display to something even more attention grabbing, such as flashing red text that reads "STOP" or "CHANGE LANES".

The time of day and current weather conditions may also affect how the vehicle chooses to communicate warning information. For instance, different information may be communicated in the daytime versus nighttime. Rain, snow, sleet, fog, dust, sun glare, etc., may also affect the ability of an approaching vehicle to detect a warning. By way of example, flares and flashing headlights may be much more effective at nighttime than during the day or when the sun is low on the horizon. So in daytime situations the system may elect to use electronic displays and/or horn honking to communicate a breakdown situation. Similarly, for trucks that may frequently travel through areas with fog, the onboard system may employ a foghorn and/or fog lights to warn other vehicles.

The system could evaluate readability as a function of distance, relative orientations of the disabled and oncoming vehicles, as well as environmental conditions to change the size, font, color and other appearance features of text or symbols of the presented information, or to select which portion or system of the vehicle will present the warning information. For instance, from far away (e.g., as far as long-range lidar or radar can detect, or more than 250 m), solid colors and flashing of imagery may be most likely to be detected. Warnings from displays higher up on the vehicle may be used for maximum visibility, for instance to prevent occlusions from other intervening objects. Closer by (e.g., between 50 m-250 m), the system may change the imagery into readable text, which may be augmented by bright colors, flashing, etc. This may also include providing warnings from other, lower display devices, such as headlamps, hazard lights, running lights, brake lights, etc.

If the breakdown occurs in a dimly lit area, an electronic display on the side or back of the vehicle (see FIG. 6A) may be used to provide alert information. During the day, contrast between the colors of the warning and the electronic display background could be important to help highlight the information. For instance, the background could be black and the warning information presented in bright colors such as yellow and/or red.

Should the lighting conditions change, e.g., from predawn to dawn, from dusk to evening, or from cloudy to sunny (or vice versa), the system may change the color palate to achieve high contrast, select different information to present, or the like.

According to another aspect, when there are multiple nearby vehicles to warn, the system may tailor alerts for different vehicles. For instance, an electronic sign or sensor housing warning may alternate between displaying something that far away vehicles can see as well as close by vehicles.

The warning(s) may be varied depending on how much traffic there is on the freeway. In one example, the disabled vehicle's response may change depending on what speed the traffic is moving at. For instance, if the traffic is moving at slower speed (either due to dense traffic or it's on a low speed surface street road), then a less aggressive warning may be sufficient. Thus, intermittent flashing or rotating lights can be employed. However, traffic is moving at higher speeds (e.g., above 55 mph), then following cars may not actually be paying enough attention to avoid the disabled vehicle. In this case, more aggressive warnings may be warranted. Here, changing the size, shape, color, etc. of the warning information rapidly (e.g., every 1.0-5.0 seconds, or more or less) can be employed Honking may be used in addition to or alternatively to the visual warnings. The duration and/or pitch of the horn can be changed as well, for instance to account for the doppler effect of rapidly approaching vehicles.

FIG. 9 illustrates another scenario 900 in which detected or inferred occlusions of other objects can affect how the onboard system handles its alerts. Here, a vehicle 902 such as a cargo truck is stalled in a driving lane. Another portion of the roadway is curved, and vegetation 904 is blocking field of view 906 from sensors of the vehicle 902. Thus, approaching vehicle 908 may not be detected by the perception system of vehicle 902, and vehicle 908 may have limited time to react to the stalled truck. In this case, based on roadgraph and any received sensor information that identifies possible occlusions, the vehicle 902 may take a more aggressive warning approach such as described above. Alternatively, if possible, the vehicle 902 may evaluate the roadgraph to determine another location with good visibility to come to a stop at. As noted above, this may include determining minimum sightlines for the onboard sensors' fields of view, possible occlusions experienced by other vehicles, as well as how quickly an oncoming vehicle is likely to detect the disabled vehicle.

Alternately, if the vehicle is able to determine roughly where it is going to come to a stop (e.g., within 0.1-0.2 miles or within 50-100 feet, or more or less), once it gets into a particular lane it can drop red emergency reflectors or other warning signs in that lane 100-200 feet before the point it anticipates coming to a stop. In one scenario, the emergency reflectors would be stored in a box or other housing that is attached to the tractor. The ECU or other control system of the vehicle would unlock the box electronically in order to drop the reflectors or other warning signs onto the road. Such signs could have a triangular pyramid shape so that no matter how the signs land on the road, at least one side will face approaching vehicles or other objects.

Such options may be limited by state or local regulations, including distances certain warning signs should be placed from the disabled vehicle. In addition to the above general options, while there may be no driver in the autonomous vehicle, the vehicle could be configured to deploy flares or warning signs automatically. By way of example, this could be done using a drone or small robot. Here, a drone may be attached to the top of the cab/tractor of a truck or a robot may be stored within the tractor, which gets dispatched when the truck stalls or otherwise becomes disabled. In such cases, a remote assistance service can help pinpoint where the drone or robot should drop the flare(s) or reflective warning signs, in order to conform with state or local regulations.

In accordance with another aspect of the technology, the disabled vehicle may obtain help from a different autonomous vehicle that is be nearby, for instance until the police or other assistance can arrive. By way of example, when the vehicle is stalled in a lane of the roadway, it may detect the presence of another autonomous vehicle behind it on the roadway either by direct communication or via a remote assistance service. Here, it would alert the other autonomous vehicle about its exact location. The other autonomous vehicle would then immediately proceed towards the disable vehicle and drive in the lane in which it is stranded. As it approaches the disabled vehicle nears, the other autonomous vehicle would deliberately slows down its speed to slow down the traffic in that lane. It could also deploy one or more electronic signs to indicate "Caution: Disabled vehicle ahead" or other information that enables the other vehicles to take corrective action.

Figure 10A:
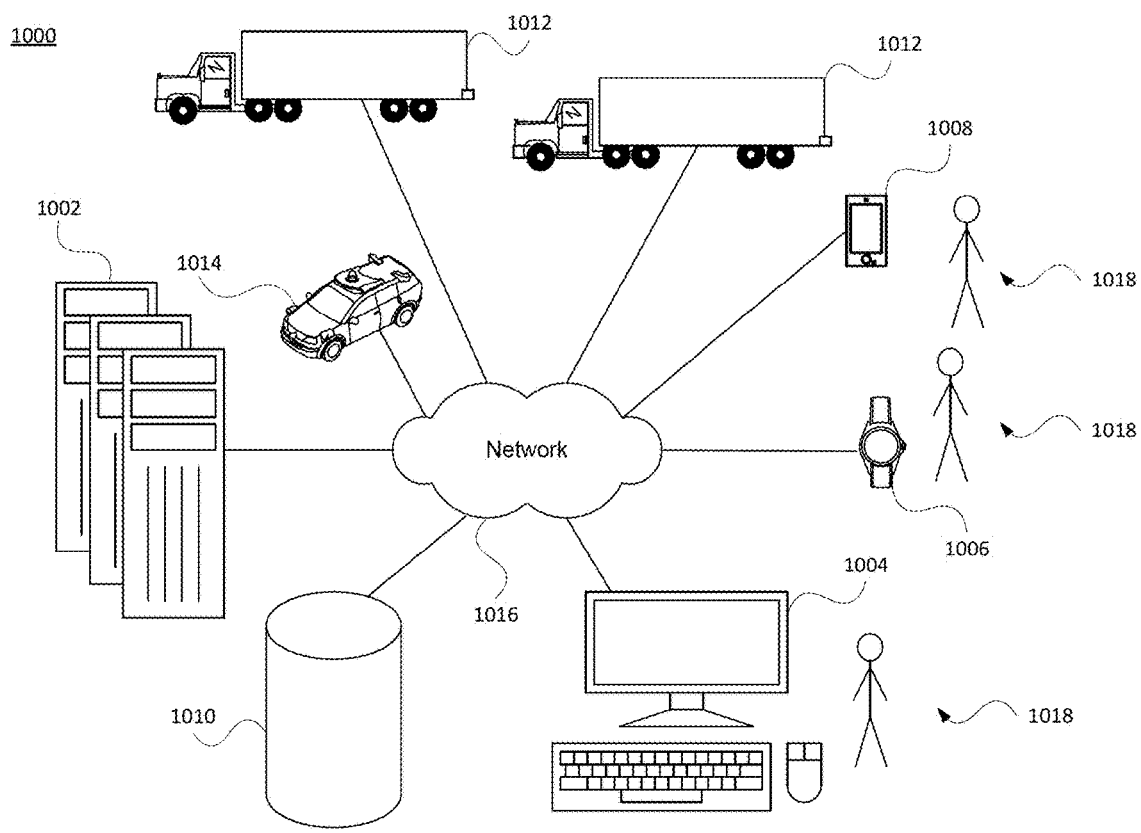
FIGS. 10A-B illustrate an example system in accordance with aspects of the disclosure.
Figure 10B:
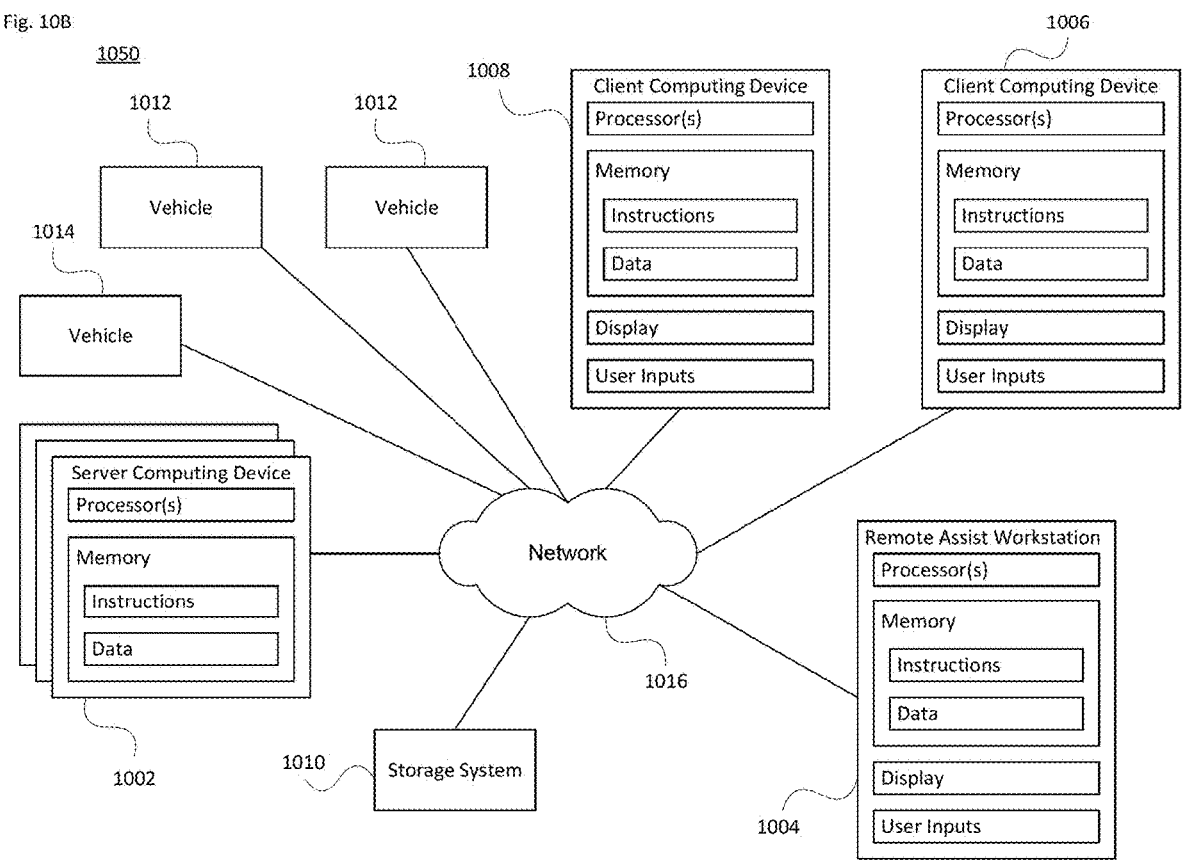

As discussed above, the on-board system of a given vehicle may communicate with another vehicle and/or may communicate with a remote system such as remote assistance. One example of this is shown in FIGS. 10A and 10B. In particular, FIGS. 10A and 10B are pictorial and functional diagrams 1000 and 1050, respectively, of an example system that includes a plurality of computing devices 1002, 1004, 1006, 1008 and a storage system 1010 connected via a network 1016. The system also includes vehicles 1012 and 1014, which may be configured the same as or similarly to vehicles 100 and 150 of FIGS. 1A-B and 1C. Vehicles 1012 and/or vehicles 1014 may be part of a fleet of vehicles. By way of example, vehicles 1012 are cargo vehicles and vehicle 1014 is a passenger vehicle such as a minivan or sedan. Although only a few vehicles and computing devices are depicted for simplicity, a typical system may include significantly more, such as dozens or hundreds.

As shown in FIG. 10B, each of computing devices 1002, 1004, 1006 and 1008 may include one or more processors, memory, data and instructions. Such processors, memories, data and instructions may be configured similarly to the ones described above with regard to FIG. 2A.

The various computing devices and vehicles may communication via one or more networks, such as network 1016. The network 1016, and intervening nodes, may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1002 may include one or more server computing devices having a plurality of computing devices, e.g., a load balanced server farm or cloud-based system, that exchange information with different nodes of a network for the purpose of receiving, processing and transmitting the data to and from other computing devices. For instance, computing device 1002 may include one or more server computing devices that are capable of communicating with the computing devices of vehicles 1012 and/or 1014, as well as computing devices 1004, 1006 and 1008 via the network 1016. For example, vehicles 1012 and/or 1014 may be a part of a fleet of vehicles that can be dispatched by a server computing device to various locations. In this regard, the computing device 1002 may function as a dispatching server computing system which can be used to dispatch vehicles to different locations in order to pick up and deliver cargo or provide other services. In addition, server computing device 1002 may use network 1016 to transmit and present information to the vehicles regarding a disabled vehicle, roadgraph data, behavior models, weather data and other information. The server computing device 1002 may also use network 1016 to communicate with a user of one of the other computing devices or a person of a vehicle, such as a driver of a vehicle operating in a semi-autonomous driving mode. In this regard, computing devices 1004, 1006 and 1008 may be considered client computing devices.

As shown in FIG. 10A each client computing device 1004, 1006 and 1008 may be a personal computing device intended for use by a respective user 1018, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1006 and 1008 may be mobile phones or devices such as a wireless-enabled PDA, a tablet PC, a wearable computing device (e.g., a smartwatch), or a netbook that is capable of obtaining information via the Internet or other networks.

In some examples, client computing device 1004 may be a remote assistance workstation used by an administrator or operator to communicate with vehicles operating in an autonomous mode, drivers of vehicles operating in semi-autonomous driving modes, or passengers as discussed further below. Although only a single remote assistance workstation 1004 is shown in FIGS. 10A-10B, any number of such workstations may be included in a given system. Moreover, although operations workstation is depicted as a desktop-type computer, operations work stations may include various types of personal computing devices such as laptops, netbooks, tablet computers, etc.

Storage system 1010 can be of any type of computerized storage capable of storing information accessible by the server computing devices 1002, such as a hard-drive, memory card, ROM, RAM, DVD, CD-ROM, flash drive and/or tape drive. In addition, storage system 1010 may include a distributed storage system where data is stored on a plurality of different storage devices which may be physically located at the same or different geographic locations. Storage system 1010 may be connected to the computing devices via the network 1016 as shown in FIGS. 10A-10B, and/or may be directly connected to or incorporated into any of the computing devices.

Storage system 1010 may store various types of information. For instance, the storage system 1010 may also store autonomous vehicle control software which is to be used by vehicles, such as vehicles 1012 or 1014, to operate such vehicles in an autonomous driving mode as described above. This information may be retrieved or otherwise accessed by a server computing device, such as one or more server computing devices 1002, in order to perform some or all of the features described herein.

For instance, storage system 1010 may store real-time state information including information about breakdowns (e.g., location of the vehicle and type of breakdown problem), received sensor data from one or more vehicles, roadgraph data, driving regulation information for different jurisdictions, detailed vehicle and behavior models for different vehicles in a fleet, etc. Any or all of this information may be shared with vehicles of the fleet, including a disabled vehicle.

The disabled vehicle can use this information alone or in combination with real-time sensor data from its onboard perception system to select one or more warning signals and methods of communicating the signals to oncoming vehicles or other objects. This can include evaluating the distance to another object, its rate of speed and orientation relative to the disabled vehicle, as well as the object type, which lane it is traveling, how close to the edge of the lane it is, the road type, time of day, weather conditions, and/or any other factors to select text, graphics or other information for display, and the device(s) to present such information.

Figure 11:
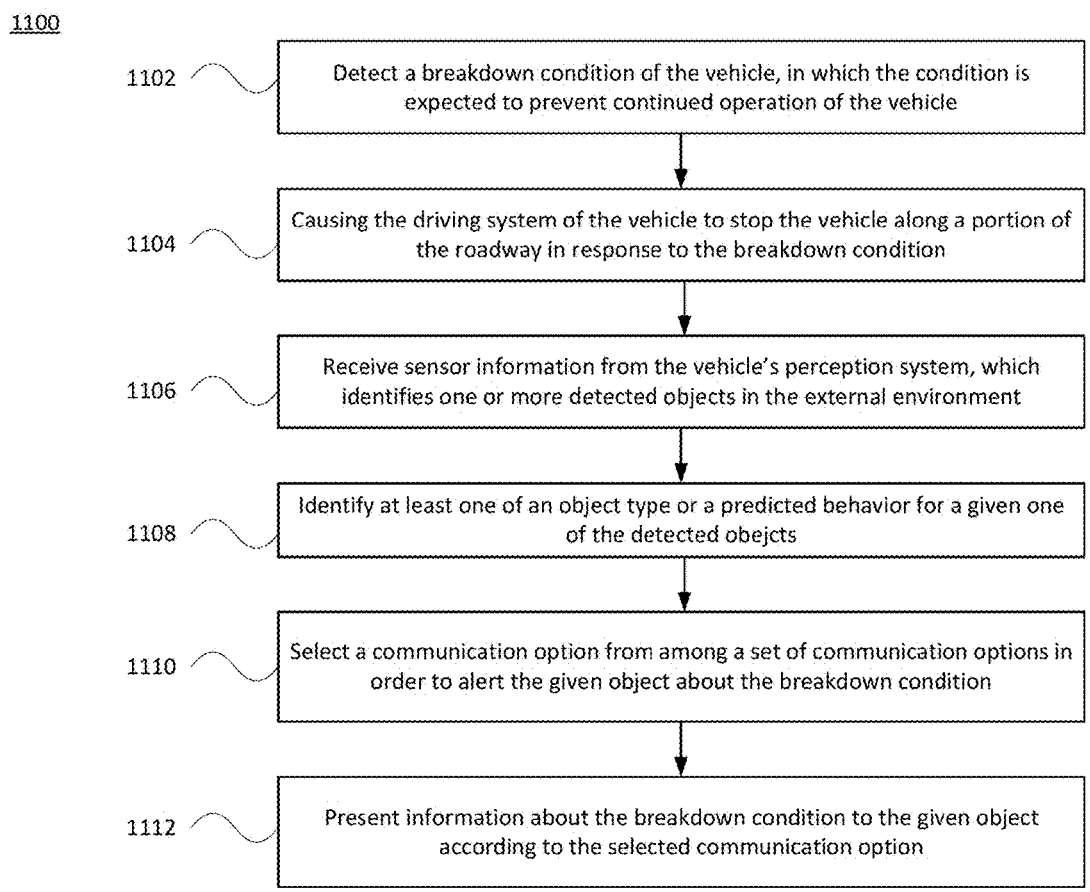
FIG. 11 is a flow diagram of a method in accordance with aspects of the disclosure.

FIG. 11 illustrates an example 1100 of a method for handling a breakdown situation for an autonomous vehicle. At block 1102, a control system of the vehicle detects a breakdown condition of the vehicle. The breakdown condition is expected to prevent continued operation of the vehicle on a roadway. The breakdown condition may be the result of a fault, failure or other condition which causes or is expected to require the vehicle to stop partly or fully along the roadway. As noted above, this can be due to a mechanical failure, electrical fault or other problem with the vehicle. It can also be due to roadway (e.g., construction, temporary closures or other detours) or environmental conditions that may involve the vehicle becoming stranded rather than being disabled. Any of these may be considered a breakdown condition.

At block 1104, in response to detecting the breakdown condition, the control system causes a driving system of the vehicle to stop the vehicle along a portion of the roadway. At block 1106, the control system receives sensor information from a perception system of the vehicle. The sensor information identifies one or more detected objects in the environment external to the vehicle. At block 1108, the control system identifies at least one of an object type or a predicted behavior for a given one of the one or more detected objects.

At block 1110, based on at least one of the identified object type or the predicted behavior, the control system selects a communication option from among a set of communication options to alert the given object about the breakdown condition. At block 1112, the vehicle presents information about the breakdown condition to the given object according to the selected communication option. As noted above, there are a number of different and/or complementary ways the vehicle may present the communication option. These may involve displaying information using different parts of the vehicle, changing how the information is displayed based on the given object, relative distance and/or visibility to that object, environmental conditions and other factors.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A vehicle configured to operate in an autonomous driving mode, the vehicle comprising:
   a driving system including a steering subsystem, an acceleration subsystem and a deceleration subsystem to control driving of the vehicle in the autonomous driving mode;
   a perception system including one or more sensors configured to detect objects in an environment external to the vehicle; and
   a control system including one or more processors, the control system operatively coupled to the driving system and the perception system, the control system being configured to:
      detect a condition expected to impact operation of the vehicle or of a roadway user other than the vehicle;
      identify at least one characteristic of the roadway user;
      generate, based on the identified characteristic, a targeted alert for the roadway user, the targeted alert including information about the detected condition;
      select a communication option from among a set of communication options for transmission of the targeted alert; and
      cause the transmission of the targeted alert using the selected communication option.

2. The vehicle of claim 1, wherein selection of the communication option is based on a direction of the roadway user relative to the vehicle.

3. The vehicle of claim 1, wherein selection of the communication option is based on a distance between the roadway user and the vehicle.

4. The vehicle of claim 1, wherein the selected communication option is a visual communication option.

5. The vehicle of claim 1, wherein the selected communication option is an audible communication option.

6. The vehicle of claim 1, wherein transmission of the targeted alert is variable based on a change in distance or a change in path of the roadway user relative to the vehicle.

7. The vehicle of claim 1, wherein the condition is an adverse condition expected to cause or require stopping along the roadway.

8. The vehicle of claim 1, wherein the condition is a fault condition.

9. The vehicle of claim 1, wherein the condition is a roadway condition.

10. The vehicle of claim 1, wherein the condition is an environmental condition.

11. The vehicle of claim 1, further comprising:
 a communication system configured to provide wireless connectivity with one or more remote devices;
 wherein the control system is operatively coupled to the communication system, and the control system is further configured to communicate with a remove service via the communication system regarding the condition.

12. The vehicle of claim 1, wherein generation of the targeted alert includes selection of which information to present to the roadway user.

13. The vehicle of claim 1, wherein the condition is a risk condition for at least one of the vehicle or the roadway user.

14. The vehicle of claim 1, wherein the vehicle includes a set of notification devices disposed at different locations along the vehicle, and selection of the communication option is based on a relative direction of the roadway user to the different locations along the vehicle.

15. The vehicle of claim 1, wherein the identified characteristic of the roadway user is a type of the roadway user.

16. The vehicle of claim 15, wherein the type is one of a vehicle type, a bicyclist, or a pedestrian.

17. A method for operating a vehicle in an autonomous driving mode, the method comprising:
 detecting, by one or more processors of a control system of the vehicle, a condition expected to impact operation of the vehicle or of a roadway user other than the vehicle;
 identifying, by the one or more processors, at least one characteristic of the roadway user;
 generating by the one or more processors, based on the identified characteristic, a targeted alert for the roadway user, the targeted alert including information about the detected condition;
 selecting, by the one or more processors, a communication option from among a set of communication options for transmission of the targeted alert; and
 causing, by the one or more processors, the transmission of the targeted alert using the selected communication option.

18. The method of claim 17, wherein selection of the communication option is based on at least one of a direction of the roadway user relative to the vehicle or a distance between the roadway user and the vehicle.

19. The method of claim 17, wherein the selected communication option is at least one of a visual communication option or an audible communication option.

20. The method of claim 17, wherein generating the targeted alert includes selecting which information to present to the roadway user.

* * * * *